United States Patent
Yadav

(10) Patent No.: US 11,265,757 B2
(45) Date of Patent: Mar. 1, 2022

(54) HANDLING UNRESPONSIVE MMES

(71) Applicant: Parallel Wireless, Inc., Nashua, NH (US)

(72) Inventor: Hritesh Yadav, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/436,758

(22) Filed: Feb. 17, 2017

(65) Prior Publication Data

US 2017/0238278 A1 Aug. 17, 2017

Related U.S. Application Data

(60) Provisional application No. 62/296,486, filed on Feb. 17, 2016.

(51) Int. Cl.
*H04W 68/02* (2009.01)
*H04W 72/04* (2009.01)
*H04W 28/02* (2009.01)
*H04W 68/04* (2009.01)

(52) U.S. Cl.
CPC ....... *H04W 28/0289* (2013.01); *H04W 68/04* (2013.01)

(58) Field of Classification Search
CPC ............. H04W 68/02; H04W 28/0289; H04W 72/048
See application file for complete search history.

(56) References Cited

U.S. PATENT DOCUMENTS

| 2003/0048791 A1 | 3/2003 | De Cnodder et al. |
| 2008/0075003 A1 | 3/2008 | Lee et al. |
| 2009/0291695 A1* | 11/2009 | Lipford ................ H04W 68/00 455/458 |

(Continued)

FOREIGN PATENT DOCUMENTS

EP 1654625 B1 5/2006

OTHER PUBLICATIONS

Third Generation Partnership Project, 3GPP TS 24.301 V8.1.0, 3rd Generation Partnership Project; Technical Specification Group Core Network and Terminals; Non-Access-Stratum (NAS) protocol for Evolved Packet System (EPS); Stage 3 (Release 8), Mar. 2009.

(Continued)

*Primary Examiner* — Walli Z Butt
*Assistant Examiner* — Thad N Defauw
(74) *Attorney, Agent, or Firm* — Michael Y. Saji; David W. Rouille

(57) ABSTRACT

A method for reducing a likelihood of paging all base stations in the tracking area is disclosed, comprising: tracking a per-cell paging success rate for cells in the radio access network and a last known cell for mobile devices attached in the radio access network; performing, based on a paging request message, a paging sequence to identify a paging set of base stations to page the specific mobile device, the paging sequence further comprising: identifying a paging set that is a last known cell for the specific mobile device based on the tracked last known cell, sending paging messages to the radio access network to all cells in the paging set, identifying a next paging set based on the tracked per-cell paging success rate, and sending paging messages to the radio access network to all cells in the next paging set.

14 Claims, 10 Drawing Sheets

(56) References Cited

U.S. PATENT DOCUMENTS

| | | | |
|---|---|---|---|
| 2010/0005178 A1 | 1/2010 | Sindelaru et al. | |
| 2012/0295643 A1* | 11/2012 | Arvidsson | H04W 68/04 |
| | | | 455/458 |
| 2013/0072146 A1 | 3/2013 | Smith | |
| 2013/0143563 A1 | 6/2013 | Singh et al. | |
| 2014/0106790 A1 | 4/2014 | Kakinada et al. | |
| 2014/0347990 A1 | 11/2014 | Chimbili et al. | |
| 2015/0103755 A1 | 4/2015 | Cui et al. | |
| 2015/0289229 A1* | 10/2015 | Ahluwalia | H04W 68/04 |
| | | | 455/458 |
| 2016/0044531 A1 | 2/2016 | Papa et al. | |
| 2016/0128020 A1 | 5/2016 | Agarwal et al. | |
| 2016/0277992 A1 | 9/2016 | Cao | |
| 2017/0013513 A1 | 1/2017 | Agarwal et al. | |
| 2017/0055238 A1 | 2/2017 | Grayson et al. | |
| 2017/0064579 A1 | 3/2017 | Park et al. | |

OTHER PUBLICATIONS

Third Generation Partnership Project, 3GPP TS 23.401 V9.16.0, 3rd Generation Partnership Project; Technical Specification Group Services and System Aspects; General Packet Radio Service (GPRS) enhancements for Evolved Universal Terrestrial Radio Access Network (E-UTRAN) access (Release 8), Dec. 2014.

Third Generation Partnership Project, 3GPP TS 36.413 V9.10.0, "3rd Generation Partnership Project; Technical Specification Group Radio Access Network; Evolved Universal Terrestrial Radio Access Network (E-UTRAN); S1 Application protocol (S1AP) (Release 9)" Sep. 2014.

Third Generation Partnership Project, 3GPP TS 25.304 V10.0.0, "3rd Generation Partnership Project; Technical Specification Group Radio Access Network; User Equipment (UE) procedures in idle mode and procedures for cell reselection in connected mode (Release 10)" Mar. 2011.

European Telecommunications Standards Institute "Universal Mobile Telecommunications System (UMTS); Radio Resource Control (RRC); Protocol Specification (3GPP TS 25.331 Version 12.3.0 Release 12)" ETSI TS 125 331 V12.3.0 (Oct. 2014).

* cited by examiner

HANDLING UNRESPONSIVE MMES

CROSS-REFERENCE TO RELATED APPLICATIONS

This application claims the benefit of priority under 35 U.S.C. §119(e) of U.S. Provisional Patent Application No. 62/296,486, filed Feb. 17, 2016, and entitled "Handling unresponsive S1 active MME in MME Pooling scenario; Handling calls when all MMEs are overloaded in HeNB architecture; Idle mode optimized paging," which is hereby incorporated by reference in its entirety for all purposes. In addition, this application incorporates the following applications by reference in their entirety: U.S. patent application Ser. No. 14/822,839, entitled "Congestion and Overload Reduction," filed on Aug. 10, 2015; and U.S. patent application Ser. No. 14/930,535, entitled "Improved Tracking Area Planning," filed on Nov. 2, 2015, along with any documents or applications referenced in any of the above documents.

BACKGROUND

Traditional telecommunications service networks separate the systems used for signaling and user data. This separation is intended to create redundancy and fault tolerance to data throughput constraints. However, the Long Term Evolution (LTE) network has a flatter architecture of LTE networks as compared with 3G networks. In 3G networks, the Radio Network Controller (RNC) resides between the base station and core network elements, effectively shielding the core network from the mass of signaling generated by the radio access network for mobility management. Because LTE uses a flat architecture, it eliminates the RNC. The core network is connected directly to the LTE base stations, in LTE, which means that it has to handle all signaling traffic.

A corollary is that the failure of one element in the core network can have consequences for a large number of base stations and UEs. For example, the Long Term Evolution (LTE) network relies on a mobility management entity (MME) to manage hundreds of eNodeBs and thousands of user equipments (UEs). MMEs are therefore a point of failure in the network that can cause hundreds of mobile devices to become unable to access the network. Failover mechanisms exist for enabling multiple redundant MMEs to be used within a network, and for MMEs to advertise their overload state to eNodeBs; however, new and innovative solutions are still needed for handling failure modes of MMEs in a network, such as when the MME is unable to report its overload state to eNodeBs it is managing.

Additionally, a user equipment (UE) enters into an idle mode when its radio connection is released. Once in idle mode, if the UE needs to be reached by the network, LTE standards define a procedure called paging. Paging involves broadcasting the UE's identity in the radio cells belonging to a set of eNodeBs grouped into tracking areas. The UE could be present in one of the cells and will respond to paging by performing a service request procedure. This results in the radio connection being re-established and the network becoming able to communicate with the UE for either control or data traffic. Since many UEs in the LTE network are in idle mode at any given time, this equates to a high number of paging attempts going on a given network. A paging strategy is needed to reach the UE while reducing load and effectively utilizing paging resources.

SUMMARY

A number of solutions are disclosed herein for mitigating congestion and overload, and for paging.

In a first embodiment, a method is disclosed, comprising: setting, at a gateway situated on a communications path between at least one core network node in at least one core network and a radio access network, a first non-responsiveness state for a core network node in a core network based on a non-responsive failure of a first number of attempts at an initial request; setting, at the gateway, a second non-responsiveness state for the core network node after expiration of the first time period and a non-responsive failure of a second number of attempts at a second request; clearing the first non-responsiveness state if the initial request receives a response within a first time period; clearing the second non-responsiveness state if the second request receives a response within a second time period; and assigning an incoming request for the core network node to a core network node not in the first or second non-responsiveness state, thereby avoiding assignment of the request to a non-responsive core network node.

The method may further comprise tearing down a packet flow between the gateway and the core network node after the expiration of the second time period based on the second non-responsiveness state. The incoming request may be an attach request from a user equipment (UE) to connect to a mobility management entity (MME) in a long term evolution (LTE) core network, and the core network node may be the MME. The method may further comprise setting, at the gateway, a third non-responsiveness state for the core network node after expiration of the second time period based on a non-responsive failure of a third number of attempts at a third request. The first time period may be longer than the second time period. The method may further comprise tearing down the packet flow between the gateway and the core network node after the expiration of the second time period when no existing calls may be active between the gateway and the core network node, and tearing down the packet flow between the gateway and the core network node after the expiration of the third period regardless of whether existing calls may be active between the gateway and the core network node. The second time period may be longer than the third time period. The method may further comprise setting first, second, and third non-responsiveness states for a plurality of core network nodes in a plurality of core networks in communication with the gateway. The method may further comprise performing mobility management entity (MME) assignment of requests based on non-responsiveness states in conjunction with MME relative capacity, thereby avoiding assignment of a request to a non-responsive MME. The method may further comprise providing, at the gateway, a mobility proxying interface between a plurality of eNodeBs and the core network node, and wherein the gateway provides a single eNodeB interface for the plurality of eNodeBs towards the core network node. The method may further comprise assigning the incoming request based on a non-responsiveness state and based on an overload state, the overload state based on a received S1AP overload control message from the core network node.

The first embodiment may also take the form of a gateway situated between a radio access network and a core network, comprising: a radio access network packet interface; a core network proxying module coupled to the radio access network packet interface for proxying requests from the radio access network packet interface to the management server; and a load management module, coupled to the core network proxying module, for monitoring load and non-responsiveness of a management server in the core network, the local packet core module being configured to: set, at the gateway, a first non-responsiveness state for the management server based on a non-responsive failure of a first number of attempts at an initial request forwarded via the core network proxying module; set, at the gateway, a second non-responsiveness state for the management server after expiration of the first time period and a non-responsive failure of a second number of attempts at a second request; clear the first non-responsiveness state if the initial request receives a response within a first time period; clear the second non-responsiveness state if the second request receives a response within a second time period; and assign an incoming request for the management server to a management server not in the first or second non-responsiveness state, thereby avoiding assignment of the request to a non-responsive management server.

The local packet core module may be further configured to tear down a packet flow between the gateway and the core network node after the expiration of the second time period based on the second non-responsiveness state. The incoming request may be an attach request from a user equipment (UE) to connect to a mobility management entity (MME) in a long term evolution (LTE) core network, and the core network node may be the MME. The local packet core module may be further configured to set, at the gateway, a third non-responsiveness state for the core network node after expiration of the second time period based on a non-responsive failure of a third number of attempts at a third request. The first time period may be longer than the second time period. The local packet core module may be further configured to tear down the packet flow between the gateway and the core network node after the expiration of the second time period when no existing calls may be active between the gateway and the core network node, and tearing down the packet flow between the gateway and the core network node after the expiration of the third period regardless of whether existing calls may be active between the gateway and the core network node. The second time period may be longer than the third time period. The local packet core module may be further configured to set first, second, and third non-responsiveness states for a plurality of core network nodes in a plurality of core networks in communication with the gateway. The local packet core module may be further configured to perform mobility management entity (MME) assignment of requests based on non-responsiveness states in conjunction with MME relative capacity, thereby avoiding assignment of a request to a non-responsive MME. The gateway may further comprise a mobility proxying interface between a plurality of eNodeBs and the core network node, and wherein the gateway provides a single eNodeB interface for the plurality of eNodeBs towards the core network node. The local packet core module may be further configured to assign the incoming request based on a non-responsiveness state and based on an overload state, the overload state based on a received S1AP overload control message from the core network node.

In a second embodiment, a method is disclosed, comprising: receiving, from a first management server at a proxy gateway, a message with a first overload state; receiving, from a second management server at the proxy gateway, a message with a second overload state; determining, at the proxy gateway, that the first and the second management servers both provide services for a single operator network; selecting, at the proxy gateway, a least-restrictive overload state from the first and the second overload state; and transmitting the least-restrictive overload state from the proxy gateway to a base station, wherein the proxy gateway provides proxying of requests from the radio access network to an operator core network and from the operator core network to the radio access network, the radio access network including the base station, the operator core network including the first and second management server, thereby providing operational information regarding overload state of a plurality of management servers to the one or more base stations.

The method may further comprise receiving, from the base station at the proxy gateway, an attach request using the least-restrictive overload state, and forwarding the attach request to the first management server if the first management server has the least-restrictive overload state, or to the second management server if the second management server has the least-restrictive overload state. The method may further comprise entering, at the base station, a radio resource reject mode at the base station based on the received least-restrictive overload state. The first and second management servers may be mobility management entities (MMEs), the overload messages may be S1AP messages, the single operator network may be a single public land mobile network (PLMN), and the radio access network and operator core network use a Long Term Evolution (LTE) protocol. The method may further comprise rejecting a mobile device attach request at the radio access network if the base station has received a least-restrictive overload state that does not permit the mobile device attach request to be forwarded to any management server. The method may further comprise forwarding an overload stop message received from a management server to the base station. The least-restrictive overload state may be a not-overloaded state, and wherein transmitting the least-restrictive overload state may comprise transmitting a message permitting normal operation. The least-restrictive overload state may be one of: a reject non-emergency mobile originated data transfer state; a permit emergency and mobile terminated access state; and a reject all radio resource control connection request signaling state, being ordered from least to most restrictive. The method may further comprise sending, to the mobile device, a rejection message and a backoff request. The backoff request further comprises a suggested backoff time, and wherein the rejection message and the backoff request further comprise source identification information of the management server. The method may further comprise transmitting the least-restrictive overload state together with an identification of a particular operator network for which the least-restrictive overload state applies. The method may further comprise transmitting an updated least-restrictive overload state based on additional overload status messages received from one or more management servers. The radio access network provides radio access according to 2G, 3G, 4G, or 5G protocols, and further comprising determining whether to send a mobile device to another radio access network node or radio access technology. The method may further comprise selecting least-restrictive overload states for, and transmitting overload states from, a plurality of management servers in a plurality of operator core networks to the base station.

The second embodiment may also take the form of a gateway server situated between a radio access network and a core network, comprising: a radio access network packet interface; a load management module for monitoring load of a plurality of management servers in the core network coupled to the radio access network packet interface; a packet forwarding module for forwarding requests to a management server coupled to the load management module; and a local packet core module coupled to the load management module and the packet forwarding module, the local packet core module being configured to identify a least-restrictive overload state for the plurality of management servers in the core network and send the least-restrictive overload state to each base station providing radio access for the core network.

The core network may be a Long Term Evolution (LTE) network, and the plurality of management servers may be mobility management entities providing mobility services to the LTE network, The packet forwarding module provides a mobility proxying interface between a plurality of eNodeBs and a mobility management entity (MME) in the core network, and wherein the gateway server provides a single eNodeB interface for the plurality of eNodeBs towards the MME.

In a third embodiment, a method is disclosed, comprising: tracking, at a messaging concentrator gateway between a radio access network and a core network, a per-cell paging success rate for cells in the radio access network and a last known cell for mobile devices attached in the radio access network; receiving a paging request message from the core network at the messaging concentrator gateway for a specific mobile device; performing, based on the paging request message, a paging sequence to identify a paging set of base stations to page the specific mobile device, the paging sequence further comprising: identifying a paging set that may be a last known cell for the specific mobile device based on the tracked last known cell, sending paging messages to the radio access network to all cells in the paging set, identifying a next paging set based on the tracked per-cell paging success rate, and sending paging messages to the radio access network to all cells in the next paging set; and exiting the paging sequence once the specific mobile device has responded to a paging message from a base station in the paging set or once all base stations in a tracking area have been sent a paging message, thereby allowing paging of mobile devices while reducing a likelihood of paging all base stations in the tracking area.

The radio access network may be a Long Term Evolution radio access network, the messaging concentrator gateway may be between at least one eNodeB and a mobility management entity (MME), and the mobile devices are UEs. The paging sequence may further comprise identifying a paging set based on a geographic distance from the identified last known cell. The method may further comprise identifying the next paging set based on the tracked per-cell paging success rate by selecting a single cell with a highest ranked paging success rate for the specific mobile device, or a set of cells with a highest paging success rate for the specific mobile device above a threshold, or a set of cells with a paging success rate for the specific mobile device that may be within a rank threshold from the single cell with the highest ranked paging success rate. The method may further comprise identifying the next paging set based on the tracked per-cell paging success rate by selecting a single cell with a highest ranked paging success rate for a plurality of mobile devices over time, or a set of cells with a highest paging success rate for the plurality of mobile devices above a threshold, or a set of cells with a paging success rate for the plurality of mobile devices that may be within a rank threshold from the single cell with the highest ranked paging success rate. The method may further comprise tracking the per-cell paging success rate across multiple cells in the radio access network or across multiple mobile devices in the radio access network. The method may further comprise tracking the per-cell paging success rate and the last known cell by maintaining a table of mobile device identifiers and cell identifiers. The mobile device identifiers may be System Architecture Evolution Temporary Mobile Subscriber Identities (S-TMSIs) or International Mobile Subscriber Identities (IMSIs), and the cell identifiers may be Evolved Universal Terrestrial Radio Access Network Cell Global Identifiers (ECGIs) or physical cell identifiers (PCIs).

The third embodiment may also take the form of a system, comprising: a plurality of eNodeBs; a core mobility node situated in a core network providing mobility services to the plurality of eNodeBs; and a signaling concentrator node situated between the plurality of eNodeBs and the core mobility node, the signaling concentrator node further comprising: a tracking area module configured to maintain a listing of each of the plurality of eNodeBs and a tracking area corresponding to each of the plurality of eNodeBs; a paging module configured to identify a last known location of a mobile device, and to send a paging message to the last known location of the mobile device; and a core network module configured to provide a single eNodeB interface with a single tracking area to the core mobility node, wherein the tracking area module may be further configured to track a per-cell paging success rate for each of the plurality of eNodeBs and a last known cell for each known mobile device in the radio access network, and wherein the tracking area module may be further configured to provide a paging set based on the tracked paging success rate and the last known cell to avoid unnecessarily paging all cells in a mobile device tracking area.

The core mobility node may be a mobility management entity for the long term evolution (LTE) protocol. The core mobility node may provide a mobility proxying interface between the plurality of eNodeBs and a mobility management entity (MME) in a core network, and wherein the core mobility node may provide a single eNodeB interface for the plurality of eNodeBs towards the MME. The tracking area module may further comprise per-cell paging success rates across multiple eNodeBs, or across multiple mobile devices. The tracking area module may further comprise a table of mobile device identifiers and cell identifiers. The mobile device identifiers may be System Architecture Evolution Temporary Mobile Subscriber Identities (S-TMSIs) or International Mobile Subscriber Identities (IMSIs). The cell identifiers may be Evolved Universal Terrestrial Radio Access Network Cell Global Identifiers (ECGIs) or physical cell identifiers (PCIs).

The third embodiment may also take the form of a core mobility node, comprising: a core network proxy module for providing a proxying interface for a plurality of eNodeBs towards a core network and a second proxying interface for a mobility management entity in the core network towards the plurality of eNodeBs; and a tracking area management module for performing steps to handle paging instructions received by the second proxying interface for a mobile device attached to one of the plurality of eNodeBs, the steps further comprising: tracking, at a messaging concentrator gateway between a radio access network and a core network, a per-cell paging success rate for cells in the radio access network and a last known cell for mobile devices attached in the radio access network; receiving a paging request message from the core network at the messaging concentrator gateway for a specific mobile device; performing, based on the paging request message, a paging sequence to identify a paging set of base stations to page the specific mobile device, the paging sequence further comprising: identifying a paging set that may be a last known cell for the specific mobile device based on the tracked last known cell, sending paging messages to the radio access network to all cells in the paging set, identifying a next paging set based on the tracked per-cell paging success rate, and sending paging messages to the radio access network to all cells in the next paging set; and exiting the paging sequence once the specific mobile device has responded to a paging message from a base station in the paging set or once all base stations in a tracking area have been sent a paging message, thereby allowing paging of mobile devices while reducing a likelihood of paging all base stations in the tracking area.

DETAILED DESCRIPTION

First Embodiment

In the MME Pooling scenario, typically, an MME is selected by eNodeB to forward the call based on its relative capability if it serves the PLMN of the serving cell and not in overload state. However if MME doesn't respond to requests, such as UE messages, attach requests, or call setup requests, then requests are returned to be handled by eNodeB locally, i.e., by timing out. In MME Pooling scenario if one of the MME is not responding to the attach request or initial UE Message even if it is S1 active and not in overload state then the call times out at eNodeB and ends up being tried/forwarded again against the same MME, typically based on relative capability, even though there are other MME's not in overload which can handle the call, because relative capability does not take overload into account. 3GPP Technical Specification TS 36.413, hereby incorporated by reference in its entirety, talks about MME Pooling and overload however not on the above issue.

If the MME doesn't respond in above scenario then it can be handled with below solution. This applies specifically to a gateway that sits in the control path between the base station and the core network. Though the 3GPP specification doesn't talk on handling this situation, it can be implemented at HNG as Parallel Wireless's proprietary solution.

The following variables used in the steps below would be tracked at a gateway, such as a Parallel Wireless HetNet Gateway (HNG), in the control flow between the RAN and the core network: (i) stage-1 attempts, stage-1 timer; (ii) stage-2 attempts, stage-2 timer; (iii) stage-3 attempts.

Figure 1:
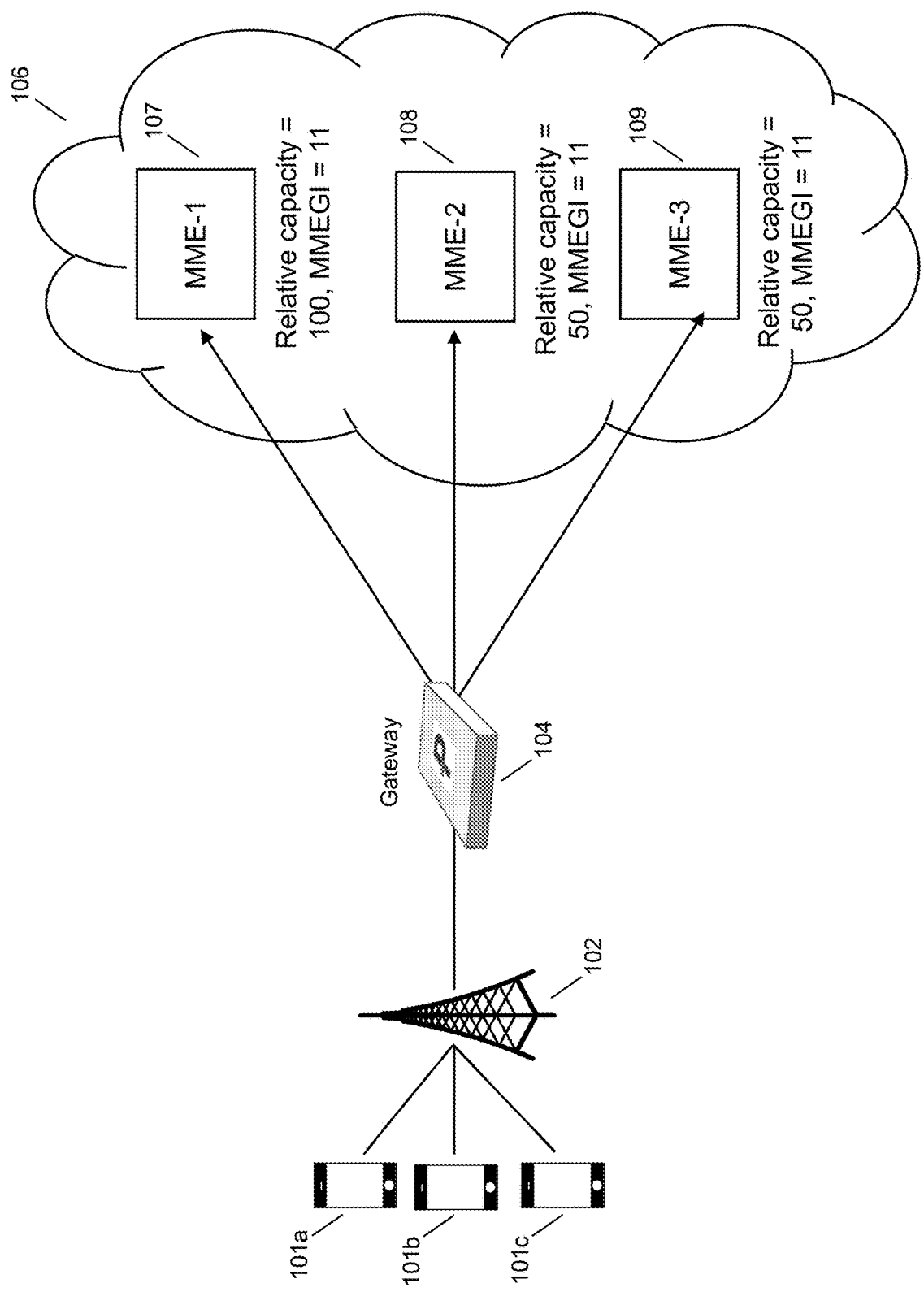
FIG. 1 is an architecture diagram illustrating a multi-MME network with a coordinating node, in accordance with some embodiments.

FIG. 1 is an architecture diagram illustrating a multi-MME network with a coordinating node, in accordance with some embodiments. A mobile network is depicted, with mobile devices 101a, 101b, 101c connected to base station 102. Mobile devices 101a, 101b, 101c are UEs and base station 102 is an LTE eNodeB (perhaps in addition to supporting other radio access technologies). Gateway 104 is a virtualization gateway sitting in between eNodeB 102 and the core network. It provides S1 and X2 proxying as described hereinbelow, along with other functionality. Gateway 104 is in the data path and control path between the radio access network (RAN) and the core network. Core network 106 includes three MMEs MME1 107, MME2 108, and MME3 109. Each of these MMEs provides redundant MME services. MME1 107 has relative capacity 100; this is a bare ratio that indicates the relative amount of connections and processes that can be handled by this device. MME2 108 and MME3 109 both have relative capacity 50. All three MMEs share the same MME group indicator, 11, indicating that they can all be used to provide mobility services within a particular MME group area.

A load balancing function, as described herein, is placed in front of the MMEs at gateway 104. In some embodiments, the load balancer uses a round robin rotation to switch between the MMEs. However, Without the load balancer as described herein, MME1 will be selected based on relative capacity even if it is not responding to requests and causing timeouts at the eNodeB, because no matter how many times they are compared, MME1 has greater relative capacity. The load balancer thus takes into account the relative capacities; however, using relative capacity can result in the repeated selection of MME1 107 even when it is non-responsive. The load balancer thus also takes the overload state and non-responsiveness state into account. Further details regarding MME load balancing are found in 3GPP TS 23.401, hereby incorporated by reference.

In some embodiments, the following steps may be used:

1. Initial UE Message/attach request is not responded by MME continuously for stage-1 attempts no of times, clear the counter if any request is responded in between before reaching the threshold.

2. Put the MME in overload state locally for stage-1 timer, and generate an alarm to look into MME.

3. Put MME out of overload state after stage-1 timer expiry.

4. If the call setup request from eNodeB is responded then let the MME be out of overload state.

5. If MME still doesn't respond for stage-2 attempts no of times (stage-2 attempts<stage-1 attempts) then tear down the SCTP connection with MME and establish it again if no existing call on MME.

6. If calls exist on MME then again put it in local overload state for stage-2 timer.

7. Put MME out of overload after stage-2 timer expiry.

8. If call setup request is responded then let the MME be out of overload state.

9. If MME still doesn't respond for stage-3 attempts no of time (stage-3 attempts<stage-2 attempts) then tear down the SCTP connection and establish it again even if calls exist on MME.

Figure 2:
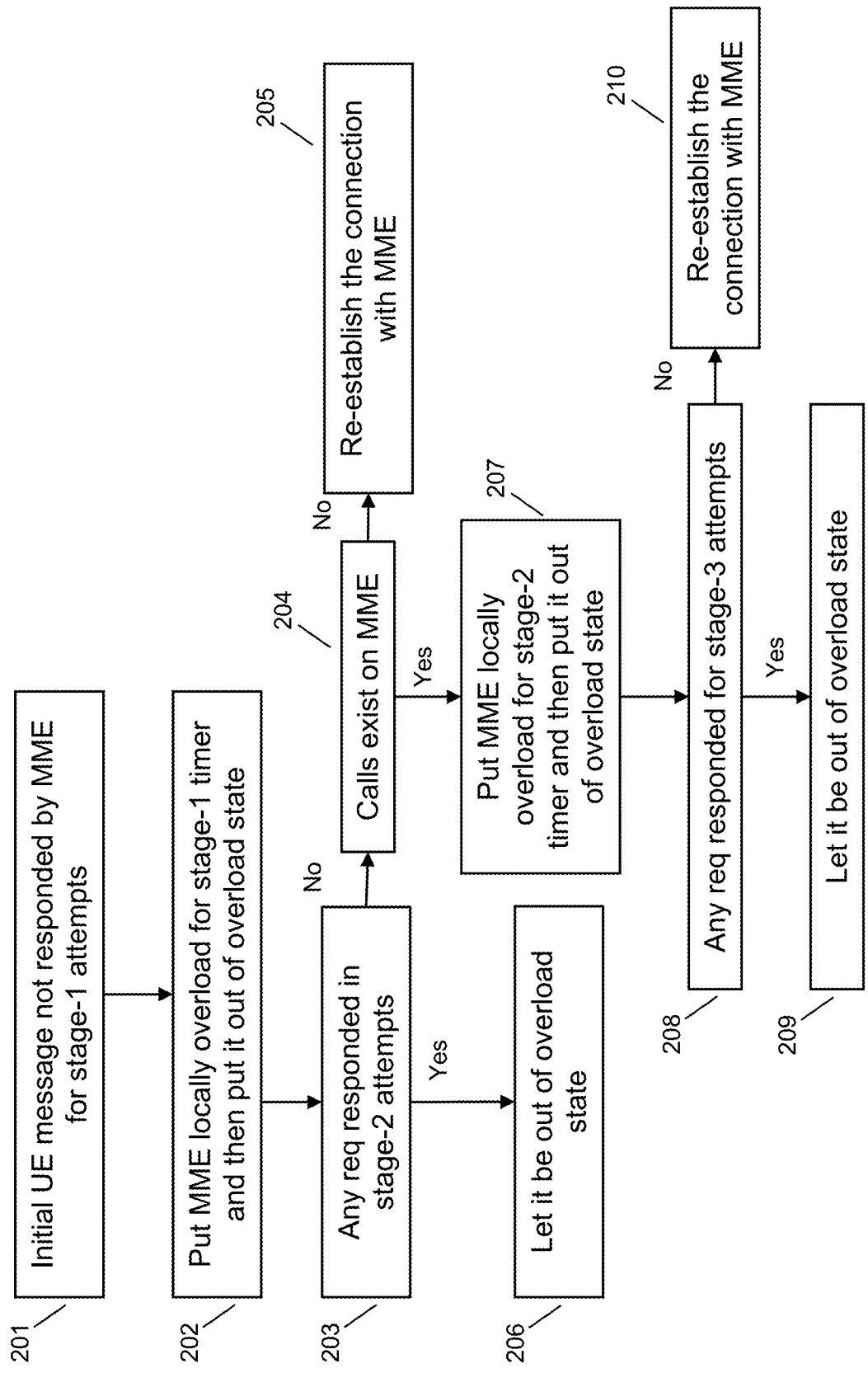
FIG. 2 is a flowchart of a method for handling an overload state of an MME, in accordance with some embodiments.

FIG. 2 is a flowchart of a method for handling an overload state of an MME, in accordance with some embodiments. Prior to the steps shown, a UE has attempted to attach to eNodeB 102, and gateway 104 has selected MME1 107. At step 201, gateway 104 detects that an initial UE message, such as an attach message, has not been responded to by MME1 107 after a first number, stage-1, of attempts. At step 202, MME1 is placed into a non-responsive state. In certain portions of the disclosure, overload state is used synonymously with non-responsive state, but in some embodiments separate method could be used for the non-responsive state, if both items are being tracked separately. MME1 will remain in this state for a period of time equal to a first timer period. Once the first timer expires, a second set of attempts is made, with a second number, stage-2, of attempts. Fewer attempts are made with each set of attempts. At step 203, if MME1 responds to any of the previously-submitted requests before the end of the first timer period, MME1 is marked as outside of overload state, step 206.

At step 204, operation continues if MME1 has not responded after the second set of attempts. Operation is directed differently based on whether active calls are currently on MME1. If no calls are currently active, the connection is reset (e.g., an SCTP connection between the gateway and the MME is torn down and an attempt is made to reestablish it) at step 205. If, however, some calls are currently active, at step 207, one more delay period (stage-2 timer) and set of attempts is made in order to avoid disconnecting any calls that are currently active. at step 208, if any request has been responded to in the third set of attempts, the MME is marked as outside the overload state, step 209. Otherwise, since no activity has been detected, at step 210, the connection is torn down without regard for existing calls and an attempt is made to reestablish the connection.

In some embodiments, proxy functionality in the filtering network node may be used to maintain state to be used for filtering, such as by maintaining an S1 proxy, an X2 proxy, or another type of proxy at the network node for an eNodeB. The state information being used at the network node may be shared with other network nodes for performing filtering of the same UE's flows at other points in the network, or for general UE characterization purposes to develop profiles of typical traffic. State may be maintained for some UEs or for all UEs, and may be maintained indefinitely, maintained for a configurable set time, maintained until network load has diminished, or maintained until manually purged, among other potential alternative embodiments.

In some embodiments, the methods and techniques described herein may be applied in situations where one or more mobile devices (e.g., UEs) have active circuit-switched voice calls, data bearers, or data calls (i.e., VOIP or VOLTE). In such situations, the state of the active calls may be maintained at one or more nodes, and this state can be used to ensure that signaling for any of these active calls is permitted to pass through unfiltered.

In the event of a power failure in a given geographical region, all the devices in this area will try to attach to the network once the network is turned on, placing a heavy load on the core network and other infrastructure. As a result, many subscriber attaches may fail. The potential also exists for other infrastructure to be impacted and for failures to cascade to other geographic regions. This problem may also be compounded if infrastructure is gradually brought online, as the demands on the infrastructure will exceed the capacity of the subset being brought online. While many overload and congestion related features are proposed in 3GPP Release 10, most of the features require the MME to handle the initial call and then reject it based on variety of parameters (say APN or access-priority) etc., and do not specify a solution for congestion at a critical node such as the MME or other similar nodes.

In some embodiments, the gateway node, being in the path of the call, will be able to detect congestion or overload before the core network itself. The gateway node can be configured for a given MME, a set of MMEs (in case of a MME pool), or another core network node or nodes, and can perform throttling to ensure a particular maximum call rate for each MME. As the gateway node can detect the arrival rate and the call success rate, it can intelligently throttle the rate of calls being sent to the MME using various algorithms. This throttling may be performed based on configuration data or may be based on real-time observation within a time window, e.g., without configuration. In some embodiments, configuration may be avoided by using a line rate of a connection between the gateway node and the MME as a threshold for the maximum number of messages that can be received without the MME going into an overload state. The gateway node may handle 3GPP-standard S1AP overload control messages if it receives these from the MME, and may honor these messages as per the specification during the MME overload period.

In some embodiments, to prevent the MME from having to determine whether to reject an incoming request, the gateway node may take over some of the functions currently performed at the MME. The gateway node may behave like an MME and send Attach Reject with a backoff timer to the UE if supported by the UE. If the UE does not support attach backoff, the gateway node can release the radio connection towards the UE with appropriate cause to make it backoff the attach procedure. In some embodiments, the gateway node can reject the UE by sending it to an appropriate 3G base station.

Although the view of a single gateway node may be restricted to the mobile devices using that gateway node, multiple gateway nodes may share information, in some embodiments, to enable the system to identify overload conditions based on mobile device traffic from other parts of the network that may be affecting the core network, and one or more gateway nodes may thereby detect congestion. This applies to all embodiments described herein.

Another aspect of certain embodiments is the determination of when to enter one or more special modes based on core network overload status. For example, if an MME sends an S1AP overload message, a throttling mode could be entered. Alternately, if an MME does not send a message but instead is determined to be unavailable due to failure to respond to messages, a non-responsive mode could be entered. These modes could be tracked separately as different overload states. This determination may be made at the aforementioned gateway node. By deciding when the core network is overloaded at a gateway node, it is possible to avoid making the determination at the core network itself. For example, if an MME is responsible for determining itself when to start providing reduced performance, it is possible that an MME may become overloaded suddenly and may thus become unable to implement congestion management procedures. This problem is significantly mitigated by implementing congestion control at a location in the network further downstream from the core network. This applies to all embodiments described herein.

Load state may be one of the following: normal, overloaded but responsive, non-responsive/down, or another state. Load states may also be based on overload states indicated by an S1AP message, e.g., permit mobile terminated traffic, emergency mobile originated data transmission only, reject all radio resource control, etc., as described in 3GPP TS 36.413, hereby incorporated by reference. Load state may also be denoted using a quantitative parameter. In certain load states, the gateway may throttle inbound traffic to reduce Si signaling load. In certain load states, the gateway may throttle inbound traffic to zero, or a small, non-zero amount. Throttling may be performed by dropping requests, by returning a rejection message using the identifier of the target core network node to appear to be the core network node with respect to the user's mobile device, or by delaying or queuing requests, or by another method. This applies to all embodiments described herein.

Second Embodiment

Figure 3:
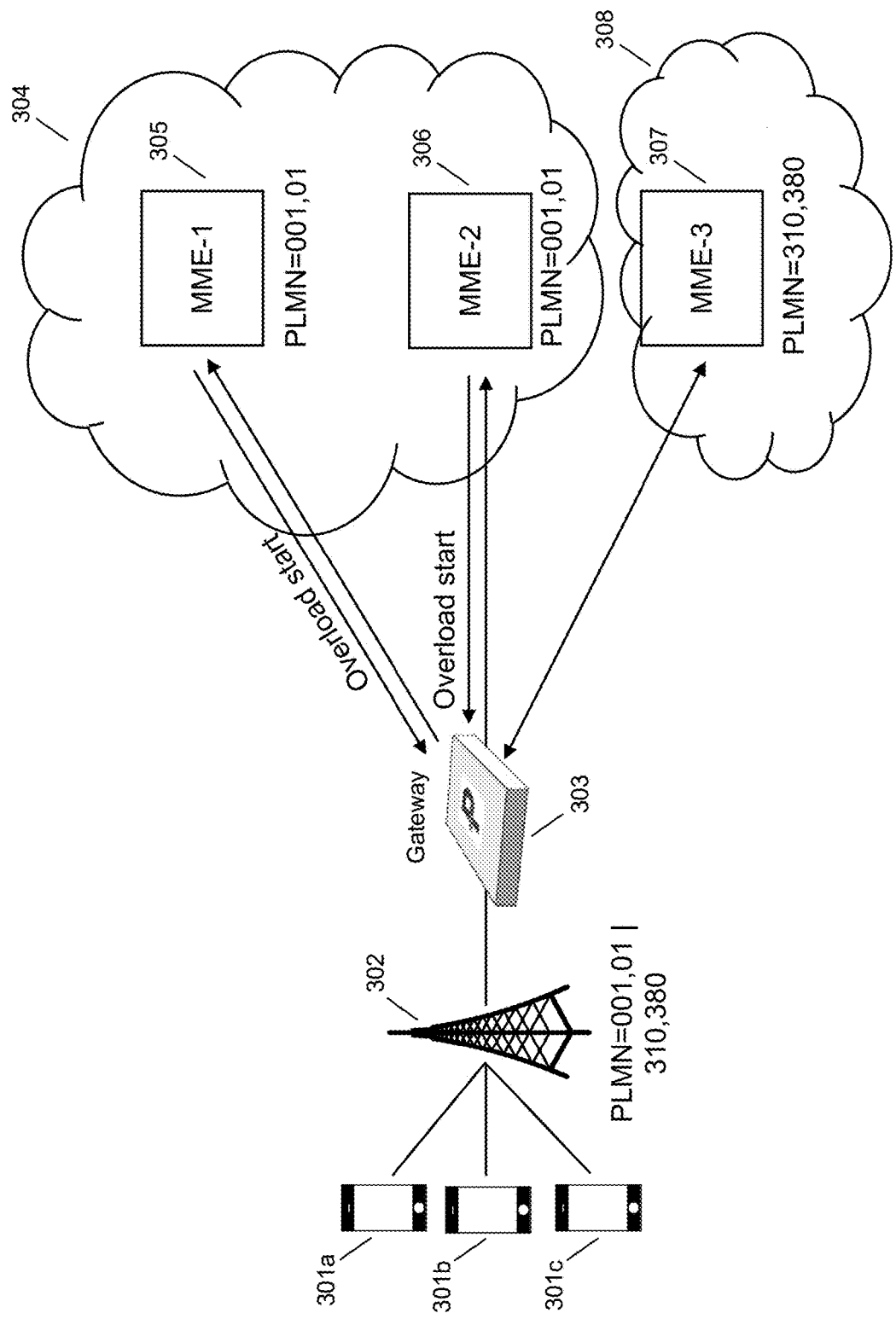
FIG. 3 is an architecture diagram illustrating a multi-MME, multi-PLMN network with a coordinating node and overload coordination, in accordance with some embodiments.

FIG. 3 is an architecture diagram illustrating a multi-MME, multi-PLMN network with a coordinating node and overload coordination, in accordance with some embodiments. UEs 301a, 301b, 301c are connected to eNodeB 302, which is providing access to two public mobile land networks (PLMNs), here identified as 001,01 and 310,380 (and to the right as PLMNs 304, 308). eNodeB 302 is controlled by coordinating gateway 303, which is a virtualization and proxy node in the data and control path as described elsewhere herein. Gateway 303 is in communication with both PLMN 304 and PLMN 308. PLMN 304 uses MME1 305 and MME2 306 to provide mobility services to PLMN=001, 01. PLMN 308 is served by MME3 307 only. In the figure, MMEs 305 and 306 are in overload, and have communicated this via S1AP messages to gateway 303. This architecture is applicable to multi-operator core networks (MOCN), as well as shared tower, neutral host, and other RAN sharing business models.

MME 305 is in an overload state such that it requests reject all RRC connection establishments for non-emergency MO DT. MME2 306 is in a different overload state and requests rejection of all RRC connection establishments for signaling. Without the improvements described herein, if the UE comes up under the serving area of CWS and PLMN 001,01, RRC connection setup is completed at eNodeB and initial UE message is forwarded to the gateway, for example with RRC-establishment-cause "MO-DATA," but since none of the MMEs are able to take up the call, the request times out at the gateway and the eNodeB does not know what happened.

In the Home eNodeB (HeNB) architecture, when all MMEs are overloaded with different/same overload actions then HeNB is aware of MME's overload state, however HNBs are not, and calls are timed out at HeNB, UE retries and again times out at HeNB. This problem can be solved by forwarding the overload state to HNBs.

In Parallel Wireless's HNG—CWS architecture, when MME is overloaded and sends overload start message to HNB then it doesn't forward it to CWS/HNB and maintains the mme overload state at itself, in this approach call/initial UE message is forwarded till HetNet Gateway and then call is timed out. UE retries and again the call is timed out at HNG only.

To solve the problem of multiple overload states in either of the above architectures, if all the MMEs or only single MME, serving a PLMN are overloaded with same or different overload actions and overload start message is received till HetNet Gateway (HNG) then HetNet Gateway should be implemented to inform the least restrictive overload action to CWS so that RRC connection can be rejected at CWS.

If at least one MME under the serving PLMN is not overloaded then, overload start message shouldn't be forwarded to CWS.

If at least one MME sends overload stop message from all the overloaded MMEs, serving the PLMN, HNG should forward the overload stop message to CWS.

In some embodiments, the following steps may be used:
1. If only single MME is serving the serving PLMN and is overloaded then forward the overload start message to CWS with same overload action as received from MME.
2. If multiple MMEs are serving the PLMN and are overloaded with different overload actions then forward the overload start message to CWS with least restrictive overload action as per below points. a. If at least one MME is not overloaded then no overload start message would be sent to CWS. b. If all MMEs are overloaded, overload action is selected based on below points: i. reject_non_emergency_mo_dt (reject non-emergency mobile originated data transmission) if at least one MME is overloaded with this cause; ii. permit_emergency_and_mt_access (permit emergency and mobile transmission access) if no MME is overloaded with reject_non_emergency_mo_dt (reject non-emergency mobile-originated data transmissions) and at least one MME is overloaded with this cause; iii. reject_all_rrc_cr signalling (reject all radio resource connection reject signaling, e.g., reject any and all RRC connections) if no MME is overloaded with either permit_emergency_and_mt_access or reject_non_emergency_mo_dt, which results in no UEs being able to connect. The use of the least restrictive constraint is desirable, especially if more than one MME is present; it is desirable to avoid applying any constraints that are not necessary if there are MMEs capable of handling the traffic and are not in an overload state.
3. If any of the MMEs sends overload stop after step 1 or step 2(b) then HNG should forward the overload stop message to CWS.

Figure 4:
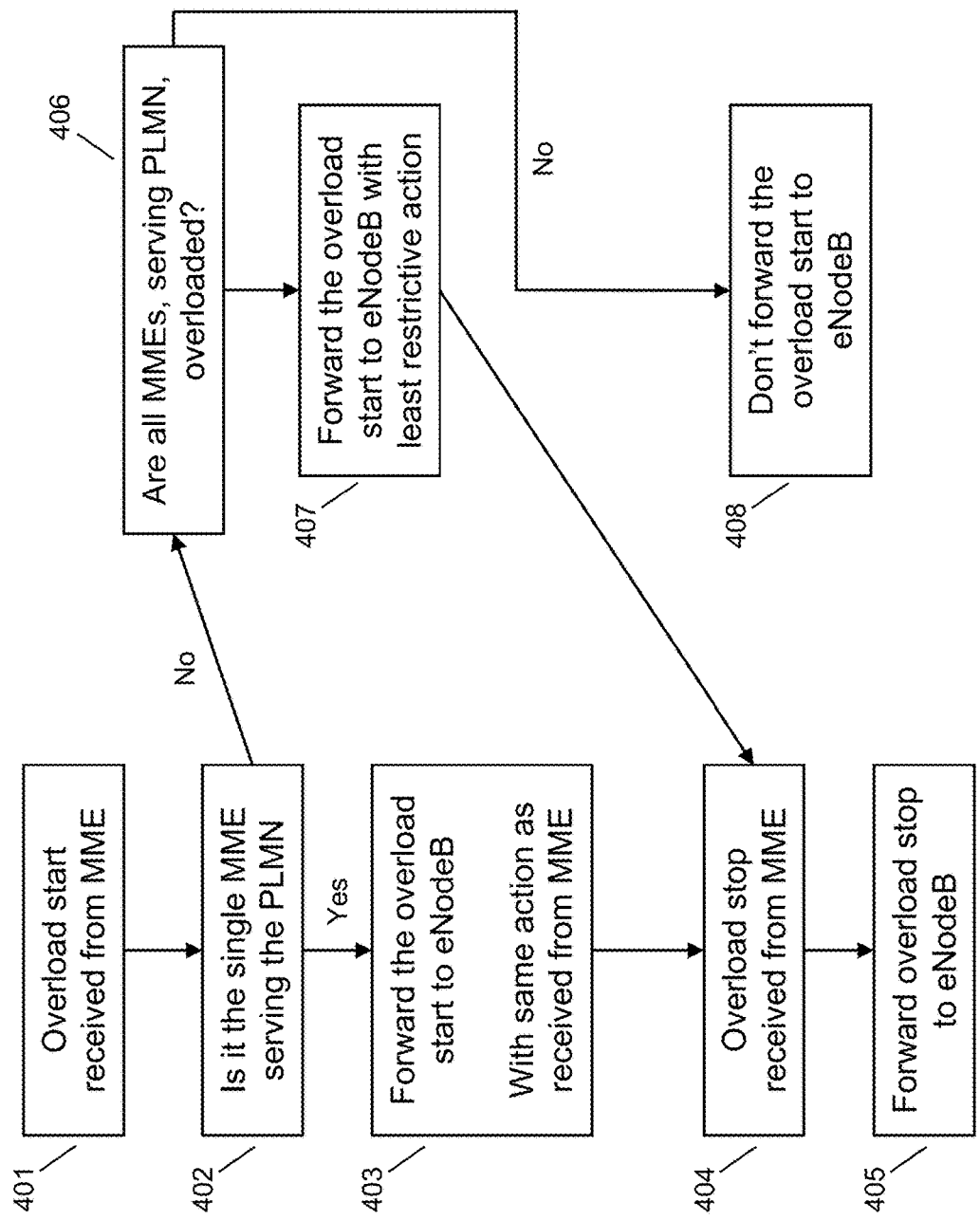
FIG. 4 is a flowchart of a second method for handling an overload state of an MME, in accordance with some embodiments.

FIG. 4 is a flowchart of a second method for handling an overload state of an MME, in accordance with some embodiments. At step 401, start messages received from the MME at the gateway 303, and is processed in light of which network it is a part of and what overload states are present in other MMEs. Overload state for this MME is marked at the gateway 303. At step 402, if this MLB is the only MME serving this network, operation continues to step 403. At step 403, the overload start message or the information contained therein is forwarded to eNodeB 302 via S1, with the same action as received from the MME. Operation continues to step 404, such that overload is maintained at eNodeB 302 until a stop message is received from the MME. At step 405, any overload stop message is forwarded to the eNodeB. At the same time, the gateway 303 updates its internal tracking state for the MME as out of overload.

Returning to step 406, this step is performed if the overload message is received from an MME which is not the single MME serving the PLMN. At this step it is necessary to determine if all of the MMEs serving this PLMN are overloaded (in the diagram, MMEs 305 and 306 both serve PLMN 304). if the answer is yes, operation proceeds to step 407. At step 407, the overload start message is sent to the eNodeB. However, this message is edited so as to indicate the least restrictive action out of all of the overloaded MMEs serving this PLMN. Otherwise, operation proceeds to step 408, and overload start is not forwarded to eNodeB 302, because another MME is available to handle traffic without the need for implementing restrictive action. Overload stop is handled for any stopped overload by reducing the restrictions to the least restrictive action required for the set of MMEs serving the PLMN.

Third Embodiment

An LTE user equipment (UE) in an active state has a location that is well-known to the core network at a cell granularity. However, when the UE is not active, it is still desirable to know the location of the UE. For this reason, when the UE is in an idle state (e.g., in one of the EMM-Registered/ECM-Idle/RRC-Idle states), its location is tracked in a tracking area (TA), which is an area identifying a group of neighbor eNodeBs. TAs are created during network radio frequency (RF) planning.

One type of signaling traffic is tracking area updates. A mobile device is capable of roaming by use of tracking areas, that is, by the use of designated logical areas between which the mobile device roams. Whenever a mobile device moves between tracking areas and connects to the network, it initiates a tracking area update (TAU) message to be sent to the core network, informing the core network that the mobile device has moved. This enables the network to find the UE when data is desired to be sent to the UE.

A UE obtains a TAI list when it attaches to an LTE network, showing the tracking areas where the LTE network believes a UE is located and within which a UE can travel without TAU. When the UE travels to a TA not in the TAI list, it is required to send a TAU to the core network, and the core network then provides the UE with a new TAI list reflecting the specific details of the UE's move (e.g. new location, moving speed, etc.) for more efficient paging.

A mobility management entity (MME) pool area is an area through which the mobile can move without a change of serving MME. Every pool area is controlled by one or more MMESs while every base station is connected to all the MMEs in a pool area by means of the S1-MME interface. Pool areas can also overlap. Typically, a network operator might configure a pool area to cover a large region of the network such as a major city and might add MMEs to the pool as the signalling load in that city increases. Similarly, an S-GW service area is an area served by one or more serving gateways (S-GWs), through which the mobile can move without a change of serving gateway. Every base station is connected to all the serving gateways in a service area by means of the S1-U interface. S-GW service areas do not necessarily correspond to MME pool areas. MME pool areas and S-GW service areas are both made from smaller, non-overlapping units known as tracking areas (TAs). These are used to track the locations of mobiles that are on standby and are similar to the location and routing areas from UMTS and GSM.

A tracking area may include a Tracking Area Identifier (TAI) and a Tracking Area Code (TAC). A TAC is the unique code that each operator assigns to each of their TAs (e.g. TA1=0x0001 for A neighborhood, TA2=0x0002 for B neighborhood, etc.). A TAI can include a public land mobile network (PLMN) ID and a TAC. A PLMN ID is a combination of a Mobile Country Code (MCC) and a Mobile Network Code (MNC), and is the unique code assigned to each operator in the world. Korea's MCC is 450, and SKT's MNC is 05. So, SKT, a Korean operator, has an MCC of 450 and an MNC of 05. This format of assigning makes a TAI uniquely identified globally.

An important type of control traffic is paging. Whenever data is sent to an idle UE, a paging request is sent to all eNodeBs in the last known tracking area of the UE. The eNodeBs then send a paging message to the UE to wake it up to receive data. Paging is resource-intensive for the network, and it is desirable to minimize paging where possible.

The tracking area is the LTE counterpart of the location area and routing area. A tracking area is a set of cells. Tracking areas can be grouped into lists of tracking areas (TA lists), which can be configured on the User Equipment (UE). Tracking area updates (TAUs) are performed periodically or when the UE moves to a tracking area that is not included in its TA list. Operators can allocate different TA lists to different UEs. This can avoid signaling peaks in some conditions: for instance, the UEs of passengers of a train may not perform tracking area updates simultaneously.

On the network side, the involved element is the Mobility Management Entity (MME). The MME configures TA lists using network access stratum (NAS) messages such as Attach Accept, TAU Accept or globally unique temporary identity (GUTI) Reallocation Command. According to the LTE standard, the MME may initiate the GUTI Reallocation procedure to reallocate the GUTI and/or TAI list at any time when a signaling association is established between UE and MME. The GUTI Reallocation procedure allocates a new GUTI and/or a new TAI list to the UE. The GUTI and/or the TAI list may also be reallocated by the Attach or the Tracking Area Update procedures.

Tracking Area list management comprises the functions to allocate and reallocate a Tracking Area Identity list to the UE. All the tracking areas in a Tracking Area List to which a UE is registered are served by the same serving MME. A tracking area identity is an identifier composed of the public land mobile network (PLMN) ID and the tracking area code (TAC). The "tracking area list concept" is used with E-UTRAN. With this concept, when the UE registers with the network, the MME allocates a set (a "list") of tracking areas to the UE. By making the centre of this set of tracking areas close to the UE's current location, the chance of a UE rapidly making another tracking area update can be reduced. A tracking area list can contain a maximum of 16 different tracking area identities, in accordance with 3GPP TS 24.301-810 § 9.9.3.33, hereby incorporated by reference. The present application may operate within this maximum, although the maximum length of the TAL is arbitrary and the methods disclosed herein could be used with any length TAL.

A standalone tracking area update, with or without serving gateway (SGW) change, occurs when a GPRS-attached or EUTRAN-attached UE experiences any of a variety of conditions, principally, when the UE detects it has entered a new TA that is not in the list of TAIs that the UE registered with the network, or when a periodic TA update timer has expired; or a variety of other conditions. The procedure is initiated by an UE in either ECM-IDLE state or ECM-CONNECTED state. The decision to perform S-GW change during the tracking area update procedure is made by the MME independently from the triggers above.

The tracking area update is further described in TS 23.401, and cell selection for UTRAN is described in 3GPP TS 25.304 and TS 25.331, each of which is hereby incorporated by reference.

A new solution is proposed using a coordinating server or gateway between the radio access network (RAN) and the core network. This gateway virtualizes several physical eNodeBs and presents itself as a single eNodeB to the packet core network, as explained in U.S. patent application Ser. No. 14/034,915, hereby incorporated by reference. In some embodiments, the coordinating server may manage virtual eNodeBs using a sector ID as a means to distinguish between cells. For example, up to 255 physical eNodeBs may be managed by the coordinating server within a single virtual eNodeB, with the virtual eNodeB being reported to the core network. The sector limit for a single cell in the LTE standard is 255, and the sector identifier may be used to distinguish between each cell at the coordinating server.

One virtual eNodeB can be configured to serve multiple physical land mobile networks (PLMNs) and multiple TAs. It can be further configured what TA may be served by each physical eNodeB within this virtual eNodeB. Advantages may be obtained in paging and tracking area list management by coordination of the multiple physical eNodeBs at the coordinating gateway.

When paging through the coordinating gateway, in some embodiments, to reach out to the UE during the idle state, MME may page the coordinating gateway. The gateway in turn has an optimized paging algorithm. It internally computes the most probable location where the UE can be reached. It may then forward the paging to physical eNodeBs which serve these locations. The coordinating gateway may have a list of physical eNodeBs and a map for determining the physical location of each of the physical eNodeBs. If UE cannot be contacted within a configured time period via this attempt, then coordinating gateway may perform additional paging, such as paging all the physical eNodeBs as per the TA list in the paging message from MME.

The coordinating gateway may keep statistics to know the success rate of the algorithm and in future it may adapt the algorithm parameters on its own to achieve a higher success rate. Alternatively, the coordinating gateway may have a list of UEs and a list of eNodeBs, and the coordinating gateway may be able to identify, from prior attach messaging, handover information, or other information, which eNodeB the UE is likely to be camped on.

In this disclosure, the core network/EPC sees multiple TAs managed by a coordinating gateway as one large boomer cell. No changes in TA planning are needed. The coordinating gateway coverage may be just one TA advertised by the coordinating gateway towards packet core. This is enabled using improved paging: to reach out to the UE during Idle state, the MME can page the coordinating gateway, which uses a special paging algorithm to compute the most probable location(s) where UE can be reached. The gateway may keep statistics to know the success rate of the algorithm and adapt the algorithm parameters on its own to achieve higher success rate.

Notable is that the coordinating server can in the base case handle all the increased complexity in the architecture. The eNodeBs themselves may be purchased from any vendor and need not have any particular functionality in order to participate in the enlarged tracking area methods described herein. This is because the eNodeB need only be assigned its own tracking area code (TAC) as normal, and the coordinating server handles paging for the enlarged tracking areas. This enables greater heterogeneity of base stations, which is useful in densification and overlay/underlay use cases.

Notable also is that the core network need not be modified for this configuration either. The coordinating server hides the complexity of the RAN, including the tracking area size, from the core network. The core network receives the benefits of less paging and fewer tracking area updates transparently. Also, the size of tracking areas can be increased without affecting capacity constraints.

When UE is in idle mode and network has some data for UE, MME triggers paging request to eNodeB with list of TAIs, now eNodeB pages all the cells in provided TACs which has been optimized in parallel wireless HetNet Gateway by first paging the last known cell and then all the cells in list of TACs if no response is received from last known cell.

For last known cell implementation, HetNet Gateway maintains a table which provides the last known cell details based on S-TMSI only and only for some limited period after the UE is idle mode.

Along with paging to last known cell, we can also page cells based on paging success rate or most responding cell for the UE before paging all the cells in list of TACs.

Paging all the cell in list of TAIs creates the following issues: 1. S1 signaling storms; 2. High UE power consumption.

Parallel wireless optimized paging solution where last known cell is paged first and then cells have the below limitations: 1. No optimization if paging request is received after the last known cell details are removed/aged out from the UE cache table at HNG. 2. No Optimization if paging request is received with IMSI. 3. No further optimization if last serving cell doesn't respond to the paging request.

However, instead of sending the paging request to all the cell, we can page last known cell and/or most expected cell(s) and then take the traditional path if no response from last known cell or most expected cells.

Figure 5:
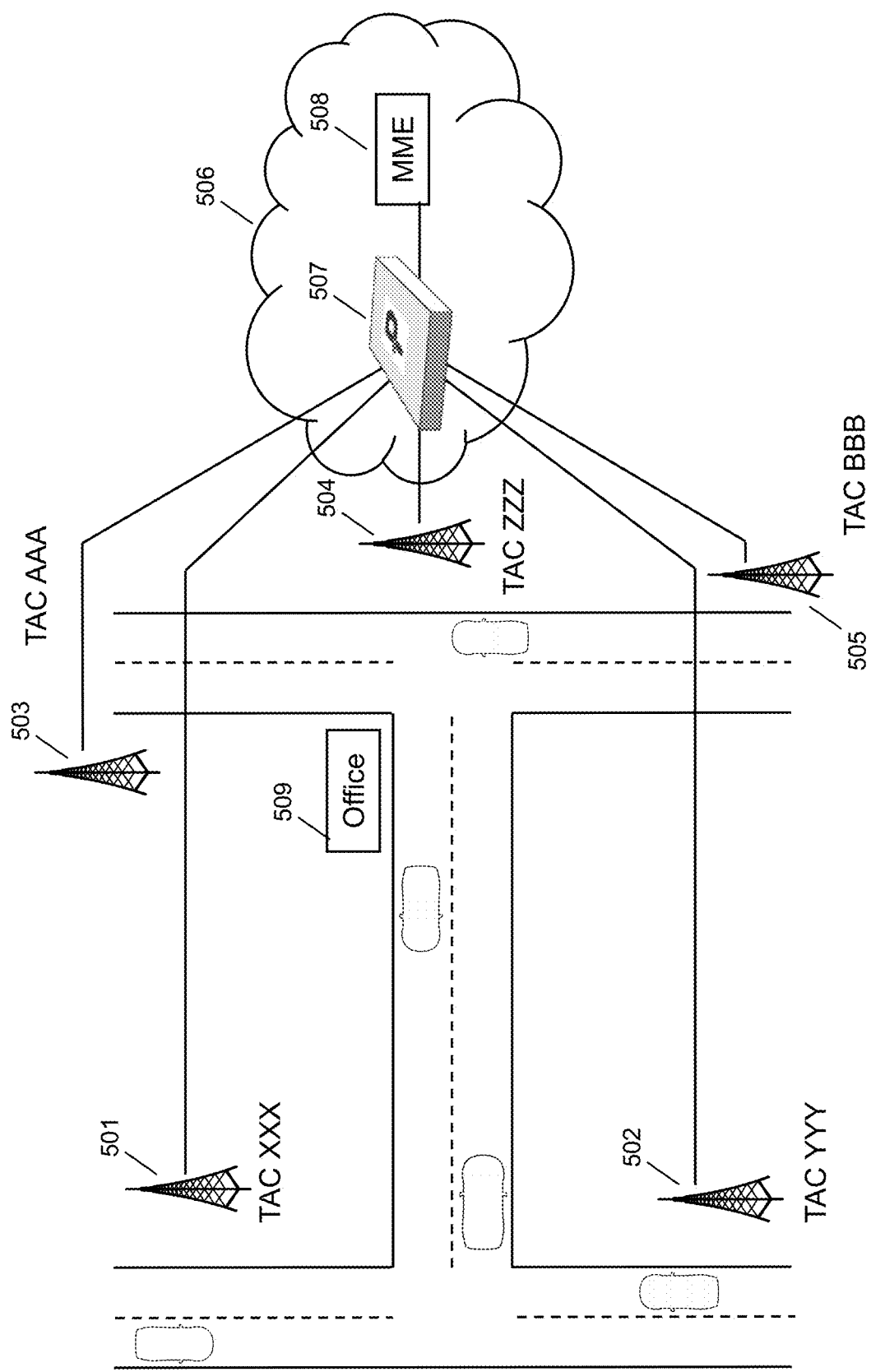
FIG. 5 is an architecture diagram illustrating tracking areas in a network with a coordinating node, in accordance with some embodiments.

For example, in the schematic diagram shown in FIG. 5, users come to office and work under cell-1 during day time and during evening, some of the users go towards cell-2 or cell-3 and some towards cell-4 or cell-5.

If the paging request is received for an UE moving towards cell-2 or cell-3 then there no point in sending the paging request to cell-4 & cell-5 as UE rarely goes to that area.

Instead of sending the paging request to all the cell in list of TAIs, we can send the paging request to specific cells first and then to all if no response is received.

To avoid sending the paging request to all the cells, we can create below mappings over time. 1. Create UE cache table, which creates ECGI mapping with S-TMSI when initial UE Message request is received with S-TMSI. So last known cell details would be stored against S-TMSI. This can be stored per UE for a configurable time. 2. Create a table with cell details in paging success rate order. This is essentially an ordered list of cells with their paging success rate, say cell-2 and cell-3 have highest paging success rate in our example. 3. May create a table with most responding cells to the paging request for the UE (IMSI/ S-TMSI), i.e., cell details of most responding cell per UE, say cell-2 responds a particular UE for most of the paging requests.

It is noted that by storing just S-TMSI, we will not be able to effectively handle paging requests that come in with IMSI. So both IMSI and S-TMSI can be used. In fact IMSI can be requested from the UE by the gateway. Similarly, both PCI and TAI and ECGI can be used; ECGI can be requested from the UE by the gateway.

In some embodiments, the following steps may be used:
1. Paging request is received from MME to HNG/eNodeB.
2. HNG/eNodeB looks up for the last known cell if paging request is received with S-TMSI.

3. If last known cell details are found then forward paging request to last know cells first and wait for 2 seconds for response.

4. If response is received from last known cell within 2 seconds, the paging transaction is completed.

5. If response is not received from last known cell within 2 seconds then we may take below path: a. Page the cell(s) with highest paging success rate which are at definite distance from last known cell and again wait for 2 seconds for response; Or, b. Page the most responding cell to previous paging requests from the UE. Or, c. Take the current path and page all the cells in TAI. Distance may be computed using GPS coordinates of a UE, GPS coordinates (either reported or preconfigured) for a base station, other geolocation coordinates, or other information, such as angle-of-arrival measurements, etc.

6. If we take 5(a) or 5(b) and no response is received from the cell(s) within 2 seconds then page all the cells in TAI list.

7. If response is received within 2 seconds after step-6 then paging transaction is complete otherwise expired?

8. If paging request is received with IMSI in Step-2 or last known cell details are not found in step-3 then we may page the most responding cell to the previous paging requests from the UE and wait for 2 seconds for response.

9. If response is received within 2 seconds after step-8 then paging transaction complete otherwise 10. Page all the cells in TAI list and wait for 4 seconds for response.

11. If response is received within 4 seconds after setp-10 then paging transaction is complete otherwise transaction is expired.

12. Or we can take 5(c) and avoid step-6 with wait time of 4 seconds in step?

In other embodiments, the following steps may be used:

1. User was last served by cell-1 and the UE moves from office to home (cell-2 or cell-3)

2. Paging request is received from MME with TAI list containing TACs (XXX+YYY+ZZZ+AAA+BBB).

3. Instead of sending the paging request to all the cells, we would first look up for last serving cell and page that if found and wait for 2 seconds for response.

4. If response is received after step3 then paging transaction is completed, however if response is not received then we may look up for cells with highest paging success rate and which are at definite distance from last serving cell i.e cell-2 and cell-3 and page them or 5. Page the cell which had responded for maximum no of times to the previous paging requests for this particular UE or 6. Take the current path and page all the cells in list of TAI.

7. If setp4 or setp5 are taken then we can wait for 2 seconds for response.

8. If response is received on step7 then paging transaction is completed otherwise.

9. Page all the cells and wait for 2 more seconds for response.

10. If response is received within 2 seconds then paging transaction is completed otherwise expired.

11. If last known cell is not found in setp3 then we can page the most responding cell to previous paging requests for the UE and wait for 2 seconds for response.

12. If response is received within 2 seconds then paging transaction is completed otherwise.

13. Page all the cells and wait for 4 seconds for response, if response is received then paging transaction is completed otherwise expired.

FIG. 5 is an architecture diagram illustrating tracking areas in a network with a coordinating node, in accordance with some embodiments. Base stations 501, 502, 503, 504, 505 are arranged around an area of a city, with homes and offices. Each base station is an eNodeB and is connected to gateway 507, which is part of core network 506 and in communication with MME 508. Base station 501 has tracking area code XXX. Base station 502 has TAC YYY. Base station 503 has TAC AAA. Base station 505 has TAC BBB. Base station 504 has TAC ZZZ. A list of tracking area identities (TAIs) for a UE of an office worker in this area will simply show all of the above, e.g., AAA BBB XXX YYY ZZZ. However, it is clear that the UE is most often camped at TAC ZZZ during the day, because it is next to office 509, and therefore base station 504 and TAC ZZZ will have the highest paging success rate. Other base stations will have high paging success rate for a given UE if they are along a particular commute of a particular user, for example. This could be tracked per UE by gateway 507, or per base station (e.g., across all UEs) by gateway 507 as well, and used for improving paging performance.

Various embodiments are contemplated. For example, the top 5 TACs could be used for paging. Or, the paging success rate may be required to exceed a threshold before making it to the special paging shortlist. Or, a minimum period of time for a UE to be camped could be used. Or, a response time taken for paging response could be used. This cache could be shared across gateways, across base stations, etc. These techniques could be combined, in some embodiments.

Figure 6:
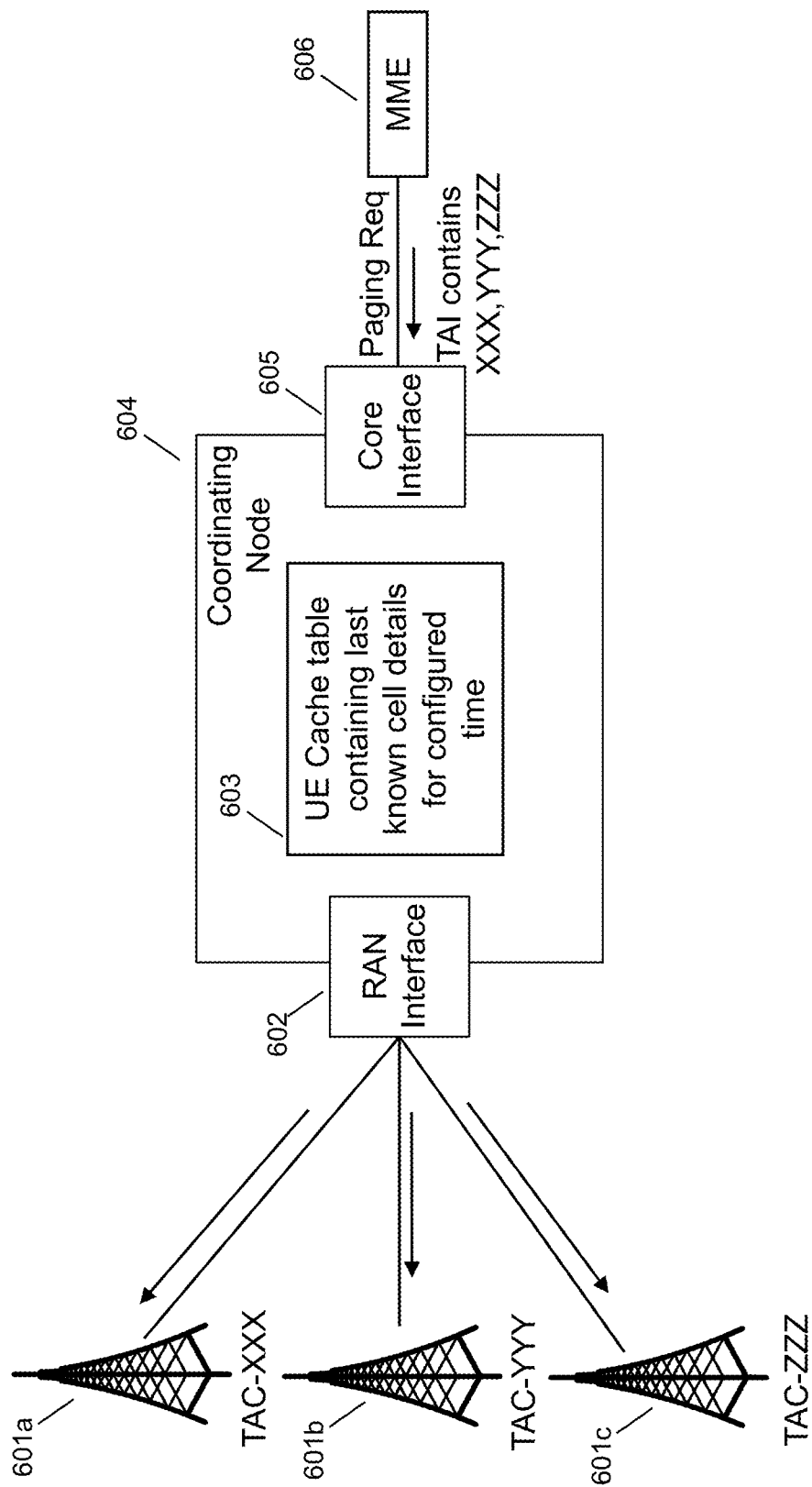
FIG. 6 is a second architecture diagram illustrating tracking areas in a network with a coordinating node, in accordance with some embodiments.

FIG. 6 is a second architecture diagram illustrating tracking areas in a network with a coordinating node, in accordance with some embodiments. Base stations 601a, 601b, 601c have tracking area codes TAC-XXX, TAC-YYY, TAC-ZZZ respectively and are connected to coordinating node 604, which is a gateway between the base stations and the MME 606. MME communications are handled at coordinating node 604 at core interface 605. RAN communications are handled at coordinating node 604 at RAN interface 602. Coordinating node 603 also includes a UE cache table 603 containing last known cell details; these details are retained for a set time that is configurable (e.g., it is a cache). When paging requests are sent by MME 606, these paging requests are conventionally forwarded to all TACs in the TAI as shown by the arrows. However, by using the UE cache 603, improvements can be made, as described herein.

Figure 7:
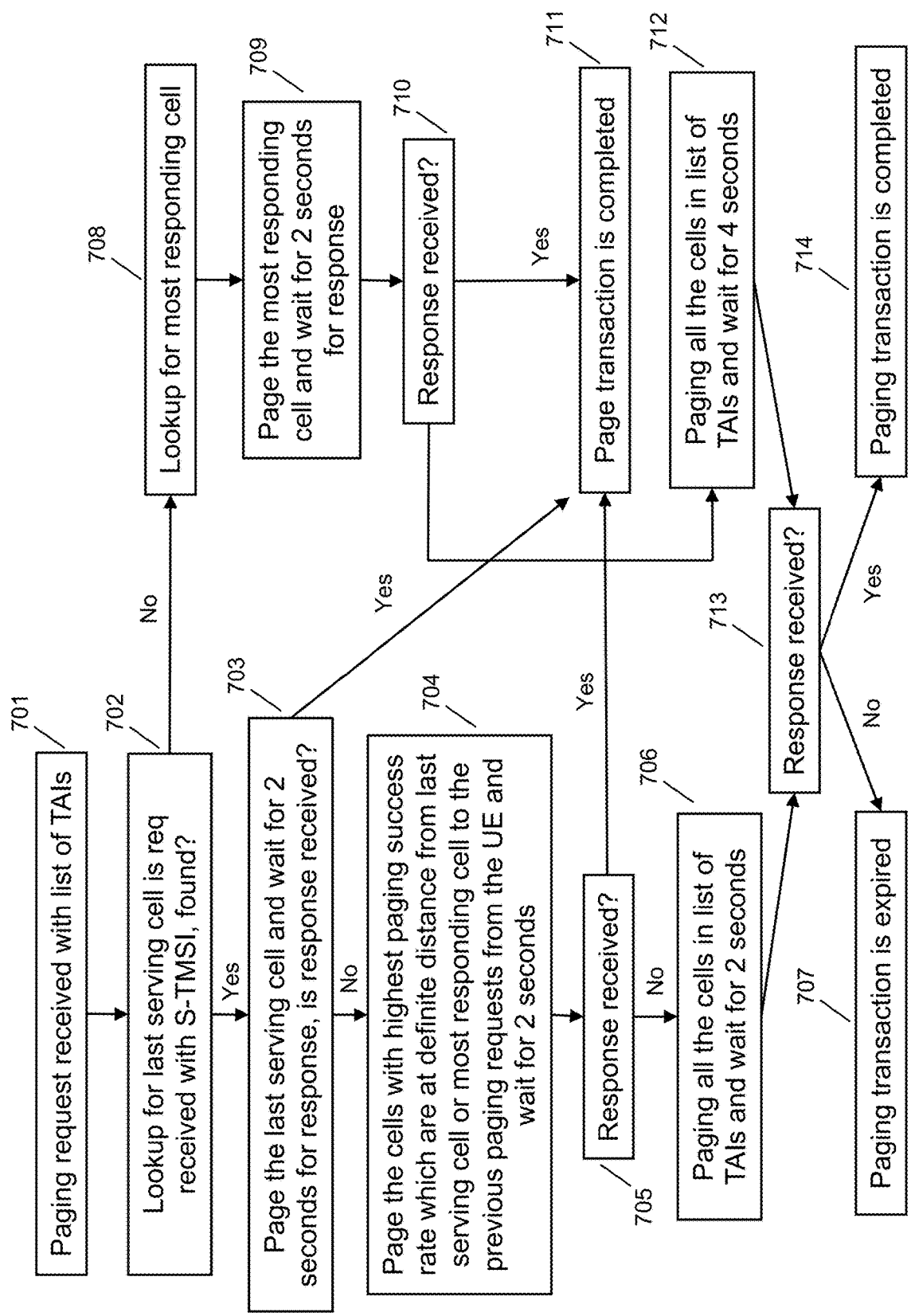
FIG. 7 is a flowchart illustrating a paging prioritization scheme, in accordance with some embodiments.

FIG. 7 is a flowchart illustrating a paging prioritization scheme, in accordance with some embodiments. At step 701, a paging request is received at the coordinating gateway; the request includes a list of TAIs, as well as a UE identifier such as an IMSI or S-TMSI. At 702, the last serving cell of that UE is looked up using S-TMSI at the gateway in the UE cache. If found, at 703, this last paging cell is paged directly for 2 seconds. This may result in completion of the paging transaction, 711.

If there is no last serving cell, at 708, a most responding cell may be identified at the gateway. This may be the cell within the list of TAIs that has the highest response rate. At 709, this cell is paged for a configurable amount of time, e.g., 2 seconds. At 710, if a response is received this may result in completion of the paging transaction, 711. If there is no response, at 712, all cells in the list of TAIs may be paged for a longer time, here 4 seconds. Regardless of whether a response is received, at 713, either the paging transaction expires, 707, or the transaction is completed, 714.

If there is a last serving cell but no response is received from it, at 704, either the cell with the highest paging success rate which is at a particular geographic distance from a serving cell, or the most responding cell to that particular UE, may be paged. If a response is received within 2 seconds, at 704, paging is complete, 711. If there is no response, at 711, all cells in the list of TAIs may be paged for a longer time, here 4 seconds. Regardless of whether a response is received, at 713, either the paging transaction expires, 707, or the transaction is completed, 714.

Figure 8:
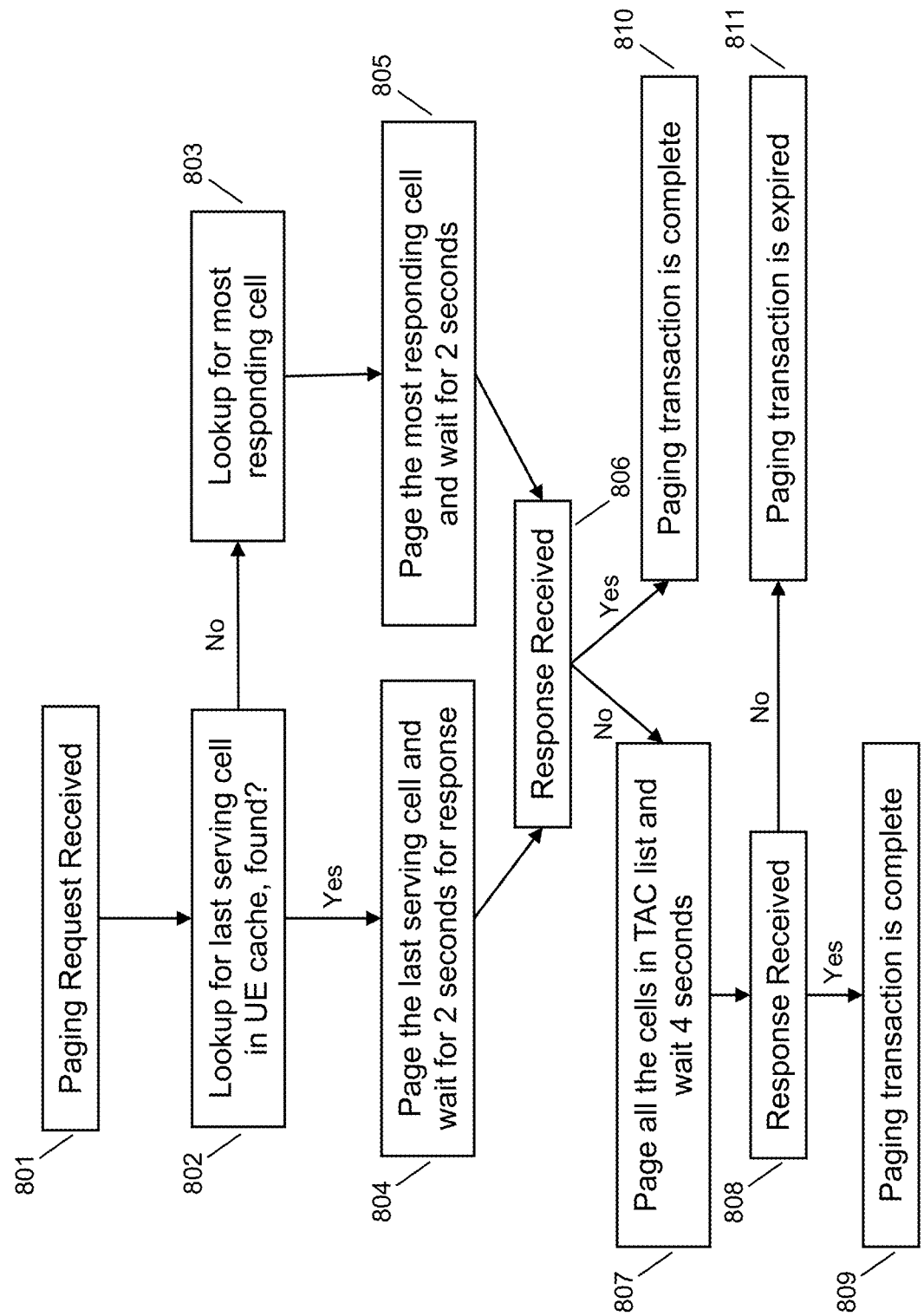
FIG. 8 is a second flowchart illustrating a paging prioritization scheme, in accordance with some embodiments.

FIG. 8 is a second flowchart illustrating a paging prioritization scheme, in accordance with some embodiments. At 801, a paging request is received. At 802, the UE cache is consulted to see if the last serving cell for this particular UE, determined by S-TMSI, is available. If it is available, at 804, this last serving cell is paged for 2 seconds. At 806, a response may be received, in which case the paging transaction is complete, 810, or not received, in which case all cells in the tracking area need to be paged, 807. If all cells are paged, 808, and no response is received, 811, the paging transaction is expired (perhaps the UE is turned off). If all cells are paged and a response is received, 809, the paging transaction is complete.

If no last serving cell for this UE is available, at 803, the most responding cell in the tracking area is identified, and at 805, that cell is paged for 2 seconds. At 806, a response may be received, in which case the paging transaction is complete, 810, or not received, in which case all cells in the tracking area need to be paged, 807. If all cells are paged, 808, and no response is received, 811, the paging transaction is expired (perhaps the UE is turned off). If all cells are paged and a response is received, 809, the paging transaction is complete.

The following hardware components are leveraged in all three embodiments described herein.

Figure 9:
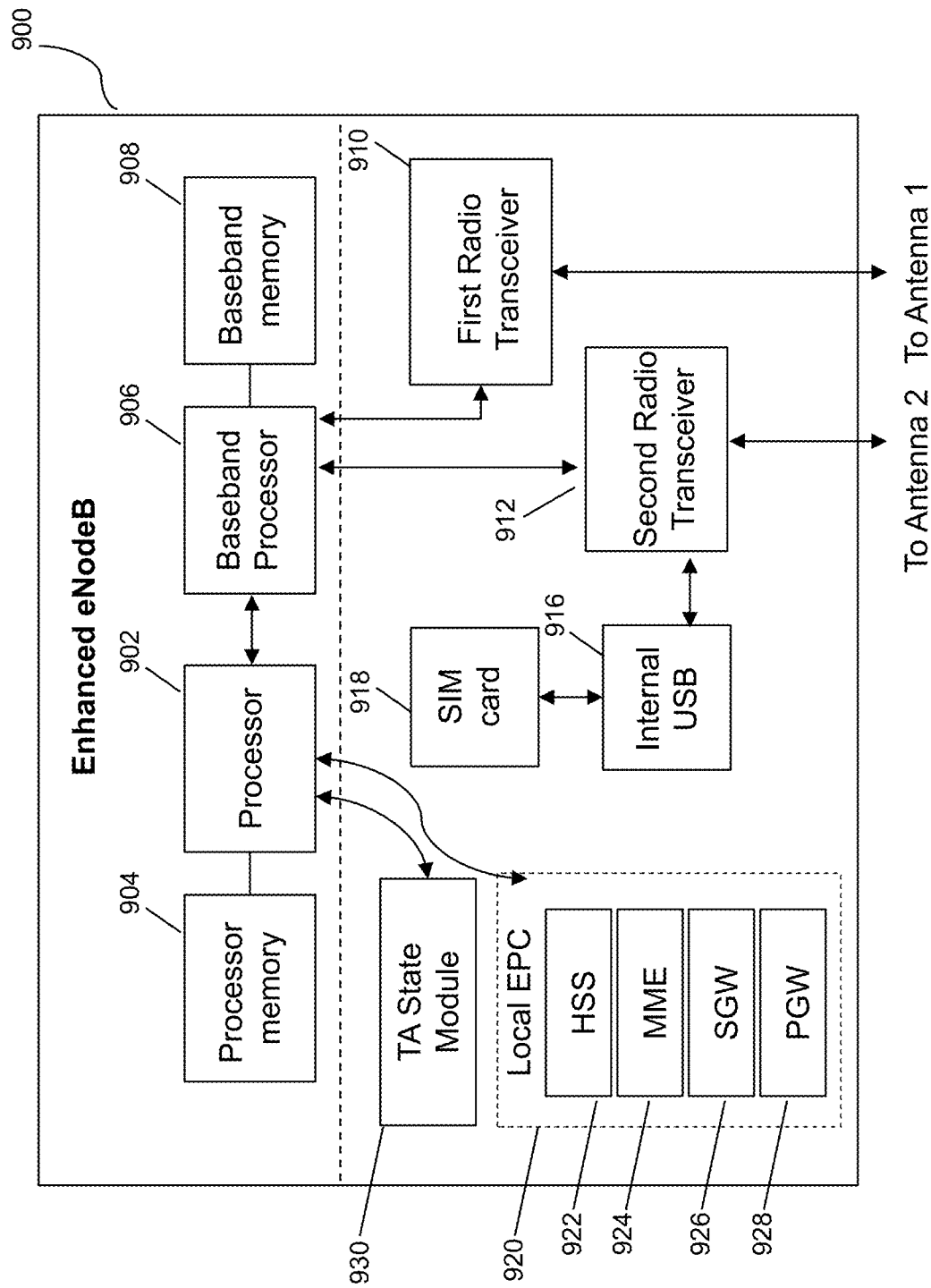
FIG. 9 is a schematic diagram of an enhanced eNodeB, in accordance with some embodiments.

FIG. 9 is a schematic diagram of a mesh network base station, in accordance with some embodiments. Mesh network base station 900 may include processor 902, processor memory 904 in communication with the processor, baseband processor 906, and baseband processor memory 908 in communication with the baseband processor. Base station 900 may also include first radio transceiver 910 and second radio transceiver 912, internal universal serial bus (USB) port 916, and subscriber information module card (SIM card) 918 coupled to USB port 914. In some embodiments, the second radio transceiver 912 itself may be coupled to USB port 916, and communications from the baseband processor may be passed through USB port 916.

A tracking area state module 930 may maintain the tracking area code for base station 900, as well as the PLMN for the base station's network, enabling the base station to report its tracking area code and tracking area identity. Tracking area state module may also pass through requests from a core network module to send a new tracking area list to a UE. Tracking area state module may be in communication with a core network, as shown. Additionally, local EPC 920 may be used for authenticating users and performing other core network-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Tracking area state module 930 and local EPC 920 may each run on processor 902 or on another processor, or may be located within another device.

Processor 902 and baseband processor 906 are in communication with one another. Processor 902 may perform routing functions, and may determine if/when a switch in network configuration is needed. Baseband processor 906 may generate and receive radio signals for both radio transceivers 910 and 912, based on instructions from processor 902. In some embodiments, processors 902 and 906 may be on the same physical logic board. In other embodiments, they may be on separate logic boards.

The first radio transceiver 910 may be a radio transceiver capable of providing LTE eNodeB functionality, and may be capable of higher power and multi-channel OFDMA. The second radio transceiver 912 may be a radio transceiver capable of providing LTE UE functionality. Both transceivers 910 and 912 are capable of receiving and transmitting on one or more LTE bands. In some embodiments, either or both of transceivers 910 and 912 may be capable of providing both LTE eNodeB and LTE UE functionality. Transceiver 910 may be coupled to processor 902 via a Peripheral Component Interconnect-Express (PCI-E) bus, and/or via a daughtercard. As transceiver 912 is for providing LTE UE functionality, in effect emulating a user equipment, it may be connected via the same or different PCI-E bus, or by a USB bus, and may also be coupled to SIM card 918.

SIM card 918 may provide information required for authenticating the simulated UE to the evolved packet core (EPC). When no access to an operator EPC is available, local EPC 920 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 910 and 912, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 902 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 910 and 912. Baseband processor 906 may use memory 908 to perform these tasks.

In some embodiments, the same architecture, design, principles, methods, and systems may be applied to, for example, MME pool areas, serving gateway (SGW) service areas, routing areas, location areas, and other areas used by a network to track and partition the location of a mobile device on the network.

In some embodiments, TACs may be assigned dynamically by the network, allowing the number of eNodeBs in a tracking area to grow and shrink as needed.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may be used to perform the steps described herein and may execute on the general purpose processor 902.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 910 and 912. Baseband processor 906 may use memory 908 to perform these tasks. Processor 902 may also receive information regarding MME overload status from a coordinating node in the network, as described elsewhere herein.

Figure 10:
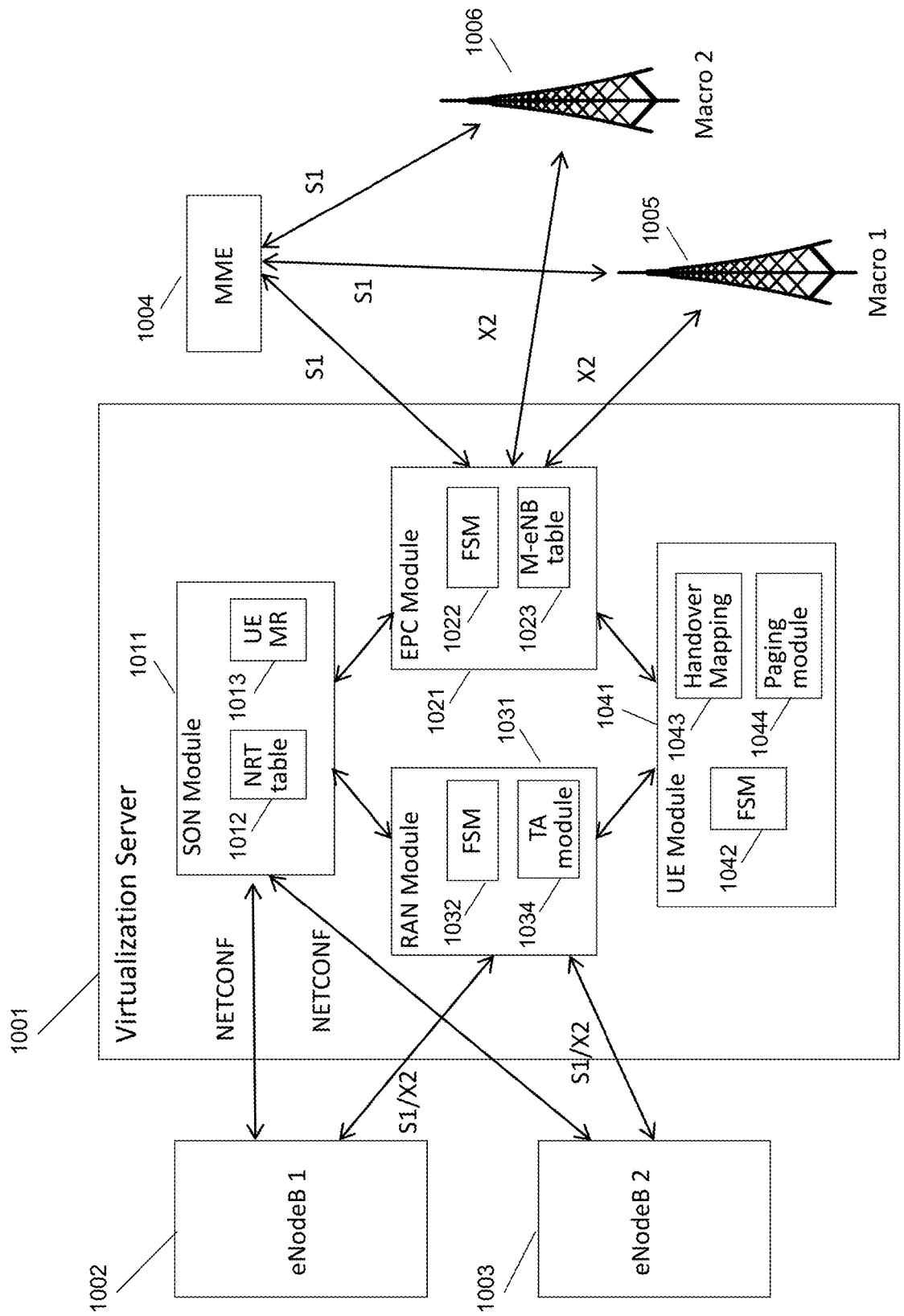
FIG. 10 is a schematic diagram of a coordinating node, in accordance with some embodiments.

FIG. 10 is a schematic diagram of a coordinating node in a Long Term Evolution (LTE) architecture, in accordance with some embodiments. Coordinating node 1001 provides services to, and is coupled to, eNodeB 1 1002 and eNodeB 10 1003, on a RAN side of a network (i.e., inside of the gateway). Coordinating node 1001 provides services to, and is coupled to, MME 1004, macro eNodeB 1005, and macro eNodeB 1006, on a core network side of the network (outside of the gateway). Coordinating node 1001 may provide services to a heterogeneous variety of access nodes, and may correspond to heterogeneous network gateway 104, in some embodiments.

Within coordinating node 1001 are self-organizing network (SON) module 1011, containing neighbor relation table (NRT) 1012 and UE measurement report processing module 1013; evolved packet core (EPC) module 1021, containing EPC finite state machine module 1022 and macro eNodeB table 1023; radio access network (RAN) module 1031, containing eNodeB finite state machine module 1032 and tracking area module 1034; and user equipment (UE) module 1041, containing UE finite state machine module 1042, S1/X2 handover mapping table 1043, and paging module 1044. Each of modules 1011, 1021, 1031, and 1041 are coupled to each other within coordinating node 1001, and may execute on one or more shared processors (not shown) coupled with memory (not shown).

In some embodiments, SON module 1011 may perform NRT maintenance, load information processing and fractional frequency reuse (FFR) processing; RAN module 1031 may perform X2 association management with eNodeBs 1002, 1003; EPC module 1021 may perform X2 association management with macro eNodeBs 1005, 1006; and UE module may perform X2 handover and S1/X2 translation between eNodeBs 1002, 1003 and macro eNodeBs 1005, 1006. All the above managers/modules interact with each other to accomplish the assigned functionality.

In any given call flow or message exchange, each module 1022, 1032, 1042 may independently track the state of the core network/macro eNodeB, the internal eNodeB, and the UE, in some embodiments, such that the state of each of the components is fully known by one of the modules.

In some embodiments, EPC module 1021 may contain EPC finite state machine module 1022 and macro eNodeB table 1023. EPC finite state machine module 1022 may track the state of any messages or call flows being sent or received with a macro eNodeB, such as macro eNodeBs 1005, 1006. EPC FSM module 1022 may, for example, determine whether a handover has been initiated by macro eNodeB 1005, 1006, as well as other functions. EPC FSM module 1022 may also track which eNodeBs within the network are involved in communicating with the macro eNodeBs, and may perform network address translation by mapping incoming requests and messages from an eNodeB address external to the gateway 1001 to an address internal to the gateway 1001, using eNodeB table 1023. In some embodiments the tracking and network address translation functions may be performed at the RAN module or in another module. Macro eNodeB table 1023 may track all macro eNodeBs and any connections, bearers, tunnels, or calls open between an eNodeB internal to the gateway, such as eNodeBs 1002 and 1003. EPC module 1021 also provides the ability to monitor load and non-responsiveness state of MMEs as described herein, including by using finite state machine 1022. Tracking tables as described within are stored on a per-MME basis in EPC module 1021.

In some embodiments, RAN module 1031 may contain RAN finite state machine module 1032 and eNodeB table 1034. RAN module 1031 is the counterpart to EPC module 1021 on the side of the network inside the gateway. RAN FSM module 1032 may track and receive messages and requests, and may track the state of the RAN node in any message exchange. An eNodeB table may include a mapping to from an eNodeB ID or cell ID to the ECGI ID used outside of the private network. In some embodiments, RAN module 1031 may perform network address translation, if applicable, on messages received by RAN module from eNodeBs 1002, 1003, so that the messages can be sent upstream to the EPC and/or core network. In some embodiments, network address translation is used at both RAN module 1031 and EPC module 1021, for connections initiated at the RAN and at the EPC, respectively.

The tracking area module 1034 maintains a list of all eNodeBs that are in each particular tracking area. For some coordinating nodes, a single tracking area may include all eNodeBs coupled to server 1001. For others, multiple tracking areas may be tracked, with some subset of the eNodeBs served by coordinating node 1001 being part of each of the multiple tracking areas. When a paging request is sent for a UE, in some cases the list of base stations that are part of the single tracking area may be considered as part of the information used for identifying a set of base stations to perform paging.

As RAN module 1031 is in the data path for all S1 communications to the core network, including communications to MME 1004, RAN module 1031 may perform proxying and network address translation for the S1 connection, in addition to supporting the X2 connection, in some embodiments. RAN module 1031 may also pass along any UE measurement reports received from UEs to either or both of UE module 1041 and SON module 1011.

In some embodiments, UE module 1041 may contain UE finite state machine module 1042 and handover mapping table 1043. UE finite state machine module 1042 may track states for call flows that are in process between a UE connected to one or more eNodeBs and either a core network node or a target eNodeB. For example, UE FSFM 1042 may track when an X2 handover request message has not been responded to and should expire. UE FSFM 1042 may also track X2/S1 handovers, in conjunction with handover mapping table 1043. When an X2 handover request is received, UE FSFM 1042 may, in some embodiments, determine whether a handover should be translated from S1 to X2, or vice versa, before the handover should continue. UE module 1041 handles UE-related requests from both the RAN module 1031 (from nodes internal to gateway 1001) and from EPC module 1021 (from nodes external to gateway 1001).

Paging tracking as described herein is performed at paging module 1044. Paging module 1044 records information about each UE that comes in contact with coordinating node 1001, through eNodeBs 1002, 1003, or other eNodeBs or base stations. Information such as physical location, historical location, handovers and handover preferences, as described elsewhere herein, is collected in the paging module. When a downlink data notification is received at the coordinating node, the EPC module 1021 requests that the paging module 1044 assist in locating the UE. Paging module 1044, in some embodiments, may come up with a precise eNodeB, or may come up with a set of eNodeBs or multiple sets of eNodeBs to be paged to locate the UE, based on the stored location information. This list of eNodeBs is then sent to the RAN module 1031 to initiate paging requests thereto.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

In some embodiments, the same or similar techniques, methods, architectures, and systems may be used to provide congestion management for 2G, 3G (including 3GPP and 3GPP2 technologies), and 5G technologies, in addition to and in conjunction with reduction for 4G and LTE technologies. 2G, 3G, and 5G technologies all have certain commonalities, such as mobility management handled by various nodes, and handsets with IMSI, IMEI or other hardware, software, user or group identifiers, that can be used in conjunction with the techniques described herein. In some embodiments, the techniques described herein could be applied to communications networks that include Wi-Fi gateways, such as ePDG, HRPD, or TWAG gateways, in communication with a centralized mobility server or authorization server, such as enterprise-managed telephone networks. In some embodiments, the techniques described herein could be applied to communications networks that include pico cells, femto cells, small cells, or other cellular base stations that are operated at a lower radio power and for fewer users than a macro cell. In some embodiments, the techniques described herein could be used with core network nodes other than MMEs, such as, for example, SGWs, RNCs or SSGNs.

In some embodiments, the techniques described herein could be applied to communications networks that include cells on wheels (COWs) and other temporary cellular installations, or other mobile or vehicle-mounted base stations, such as those described in U.S. Pat. No. 8,867,418, which is hereby incorporated by reference in its entirety; in fact, such temporary and mobile cellular nodes may have additional utility in the event of an emergency, and would be well-suited to be used together with the techniques described herein.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to Wi-Fi networks, networks in an unlicensed band, including 3GPP networks (LTE-U/LTE-AA), or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Accordingly, the disclosure of the present invention is intended to be illustrative of, but not limiting of, the scope of the invention, which is specified in the following claims.

The invention claimed is:

1. A method, comprising:
    tracking, at a messaging concentrator gateway between a radio access network and a core network, a per-cell paging success rate for cells in the radio access network and a last known cell for mobile devices attached in the radio access network;
    providing, by a core mobility node, a mobility proxying interface between the plurality of eNodeBs and a mobility management entity (MME) in a core network, the core mobility node providing a single eNodeB interface for the plurality of eNodeBs towards the MME;

receiving a paging request message from the core network at the messaging concentrator gateway for a specific mobile device;

performing, based on the paging request message, a paging sequence to identify a paging set of base stations to page the specific mobile device, the paging sequence further comprising: identifying a first paging set that is at least a last known cell for the specific mobile device based on the tracked last known cell, sending paging messages to the radio access network to all cells in the first paging set, identifying a second paging set based on the tracked per-cell paging success rate with a cell identified by using a geographic distance from a serving cell, and sending paging messages to the radio access network to all cells in the second paging set; and exiting the paging sequence once the specific mobile device has responded to a paging message from a base station in the paging set or once all base stations in a tracking area have been sent a paging message, thereby allowing paging of mobile devices while reducing a likelihood of paging all base stations in the tracking area.

2. The method of claim 1, wherein the radio access network is a Long Term Evolution radio access network, the messaging concentrator gateway is between at least one eNodeB and a mobility management entity (MME), and the mobile devices are UEs.

3. The method of claim 1, wherein the paging sequence further comprises identifying a paging set based on a geographic distance from the identified last known cell.

4. The method of claim 1, further comprising identifying the next paging set based on the tracked per-cell paging success rate by selecting a single cell with a highest ranked paging success rate for the specific mobile device, or a set of cells with a highest paging success rate for the specific mobile device above a threshold, or a set of cells with a paging success rate for the specific mobile device that is within a rank threshold from the single cell with the highest ranked paging success rate.

5. The method of claim 1, further comprising identifying the next paging set based on the tracked per-cell paging success rate by selecting a single cell with a highest ranked paging success rate for a plurality of mobile devices over time, or a set of cells with a highest paging success rate for the plurality of mobile devices above a threshold, or a set of cells with a paging success rate for the plurality of mobile devices that is within a rank threshold from the single cell with the highest ranked paging success rate.

6. The method of claim 1, further comprising tracking the per-cell paging success rate across multiple cells in the radio access network or across multiple mobile devices in the radio access network.

7. The method of claim 1, further comprising tracking the per-cell paging success rate and the last known cell by maintaining a table of mobile device identifiers and cell identifiers.

8. The method of claim 7, wherein the mobile device identifiers are System Architecture Evolution Temporary Mobile Subscriber Identities (S-TMSIs) or International Mobile Subscriber Identities (IMSIs), and wherein the cell identifiers are Evolved Universal Terrestrial Radio Access Network Cell Global Identifiers (ECGIs) or physical cell identifiers (PCIs).

9. A system, comprising:
a plurality of eNodeBs;
a core mobility node situated in a core network providing mobility services to the plurality of eNodeBs; and
a signaling concentrator node situated between the plurality of eNodeBs and the core mobility node, the signaling concentrator node further comprising hardware and software for:
maintaining a listing of each of the plurality of eNodeBs and a tracking area corresponding to each of the plurality of eNodeBs;
identifying a last known location of a mobile device, and to send a first paging message to the last known location of the mobile device; and
providing a single eNodeB interface with a single tracking area to the core mobility node, tracking a per-cell paging success rate for each of the plurality of eNodeBs and a last known cell for each known mobile device in the radio access network, and
providing a paging set including a first paging set based on at least the last known cell and a second paging set based on the tracked per-cell paging success rate and identifying a second paging set with a cell identified by using a geographic distance from a serving cell to avoid unnecessarily paging all cells in a mobile device tracking area, wherein the core mobility node provides a mobility proxying interface between the plurality of eNodeBs and a mobility management entity (MME) in a core network, and wherein the core mobility node provides a single eNodeB interface for the plurality of eNodeBs towards the MME.

10. The system of claim 9, wherein the core mobility node is a mobility management entity for the long term evolution (LTE) protocol.

11. The system of claim 9, wherein the signaling concentrator maintains per-cell paging success rates across multiple eNodeBs, or across multiple mobile devices.

12. The system of claim 9, wherein the signaling concentrator maintains a table of mobile device identifiers and cell identifiers.

13. The system of claim 12, wherein the mobile device identifiers are System Architecture Evolution Temporary Mobile Subscriber Identities (S-TMSIs) or International Mobile Subscriber Identities (IMSIs), and wherein the cell identifiers are Evolved Universal Terrestrial Radio Access Network Cell Global Identifiers (ECGIs) or physical cell identifiers (PCIs).

14. A core mobility node, comprising hardware and software for:
providing a proxying interface for a plurality of eNodeBs towards a core network and a second proxying interface for a mobility management entity in the core network towards the plurality of eNodeBs; and
handling paging instructions received by the second proxying interface for a mobile device attached to one of the plurality of eNodeBs, the handling paging instructions further comprising:
tracking, at a messaging concentrator gateway between a radio access network and a core network, a per-cell paging success rate for cells in the radio access network and a last known cell for mobile devices attached in the radio access network;
receiving a paging request message from the core network at the messaging concentrator gateway for a specific mobile device;
performing, based on the paging request message, a paging sequence to identify a paging set of base stations to page the specific mobile device, the paging sequence further comprising: identifying a first paging set that is a last known cell for the specific mobile device based on the tracked last known cell, sending paging messages to the radio access network to all cells in the first paging set, identifying a second paging set based on the tracked per-cell paging success rate with a cell identified by using a geographic distance from a serving cell and sending paging messages to the radio access network to all cells in the second paging set; and exiting the paging sequence once the specific mobile device has responded to a paging message from a base station in the paging set or once all base stations in a tracking area have been sent a paging message, thereby allowing paging of mobile devices while reducing a likelihood of paging all base stations in the tracking area.

\* \* \* \* \*